US008433779B2

(12) United States Patent
Kumagai et al.

(10) Patent No.: US 8,433,779 B2
(45) Date of Patent: Apr. 30, 2013

(54) COMPUTER SYSTEM FOR ALLOCATING IP ADDRESS TO COMMUNICATION APPARATUS IN COMPUTER SUBSYSTEM NEWLY ADDED AND METHOD FOR NEWLY ADDING COMPUTER SUBSYSTEM TO COMPUTER SYSTEM

(75) Inventors: Atsuya Kumagai, Kawasaki (JP); Toi Miyawaki, Yokohama (JP); Kiminori Sugauchi, Yokohama (JP); Yutaka Kudo, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 4 days.

(21) Appl. No.: 13/133,108

(22) PCT Filed: May 16, 2011

(86) PCT No.: PCT/JP2011/002700
§ 371 (c)(1),
(2), (4) Date: Jun. 6, 2011

(87) PCT Pub. No.: WO2012/157017
PCT Pub. Date: Nov. 22, 2012

(65) Prior Publication Data
US 2012/0297037 A1     Nov. 22, 2012

(51) Int. Cl.
*G06F 15/177* (2006.01)
(52) U.S. Cl.
USPC .......................................................... 709/220
(58) Field of Classification Search ........... 709/220–222
See application file for complete search history.

(56) References Cited

U.S. PATENT DOCUMENTS

| | | | |
|---|---|---|---|
| 6,262,976 B1 * | 7/2001 | McNamara | 370/254 |
| 6,345,294 B1 * | 2/2002 | O'Toole et al. | 709/222 |
| 6,757,723 B1 * | 6/2004 | O'Toole et al. | 709/222 |
| 6,957,276 B1 | 10/2005 | Bahl | |
| 7,099,957 B2 * | 8/2006 | Cheline et al. | 709/245 |
| 7,584,301 B1 * | 9/2009 | Joshi | 709/244 |
| 7,587,518 B2 | 9/2009 | Bahl | |
| 7,852,861 B2 * | 12/2010 | Wu et al. | 370/401 |
| 2005/0174998 A1 | 8/2005 | Vesterinen et al. | |
| 2006/0126629 A1 | 6/2006 | Dooley et al. | |

FOREIGN PATENT DOCUMENTS

EP    1 569 419 A1    8/2005

OTHER PUBLICATIONS

Droms, R., IETF RFC2131: DHCP (Dynamic Host Configuration Protocol), Mar. 1997.

* cited by examiner

*Primary Examiner* — Alicia Baturay
(74) *Attorney, Agent, or Firm* — Volpe and Koenig, P.C.

(57) ABSTRACT

A computer subsystem is provided with a switch apparatus group that is at least one switch apparatus that is coupled to the communication network and a plurality of communication apparatuses that includes an internal management apparatus (an internal apparatus). The internal management apparatus transmits a request of a plurality of IP addresses that are allocated to the plurality of communication apparatuses to an external management apparatus that is disposed outside the computer subsystem. The external management apparatus manages whether or not each of M static IP addresses can be allocated, specifies a plurality of static IP addresses that can be allocated in response to the request, and transmits the plurality of specified static IP addresses to the internal management apparatus. The internal management apparatus allocates the plurality of static IP addresses to a plurality of internal apparatus.

14 Claims, 20 Drawing Sheets

Fig. 11

| IP address | MAC address | SU ID | State |
|---|---|---|---|
| 10.1.2.1 | 00-0F-FE-F7-2D-11 | 0011 | Coupled |
| 10.1.2.2 | 00-0F-FE-F7-22-11 | 0011 | Coupled |
| 10.1.2.3 | | 0011 | |
| 10.1.2.4 | | 0011 | |
| 10.1.2.5 | | | Unallocated |
| ⋮ | ⋮ | ⋮ | ⋮ |
| 10.1.2.26 | | | Unallocated |
| 10.1.2.27 | 00-0F-FE-E7-2D-11 | 0009 | Coupled |
| 10.1.2.28 | 00-0F-FE-7F-22-34 | 0009 | Coupled |

Fig. 12

| I/F ID | NIC ID | IP address | VLAN tag |
|---|---|---|---|
| 1 | 1 | 192.168.1.1 | 1 |
| 2 | 1 | 10.1.2.1 | 2 |
| 3 | 1 | 10.1.2.2 | 3 |
| 4 | 2 | | 0 |

Fig. 13

| External global IP address | Internal local IP address |
|---|---|
| 10.1.2.1:10002 | 192.168.1.2 |
| 10.1.2.1:10003 | 192.168.1.3 |
| 10.1.2.1:10004 | 192.168.1.4 |
| ------ | ------ |

| VLAN | | | | | | | | |
|---|---|---|---|---|---|---|---|---|
| 1 | T | T | T | T | | | | |
| 2 | U | U | U | | U | U | | |
| 3 | | | | | T | T | T | T |
| | P1 | P2 | P3 | P4 | P5 | P6 | P7 | P8 |

| 2501 | 2502 | 2503 | 2504 | 87 |
|---|---|---|---|---|
| Internal Local IP Address | Internal Global IP Address | External Local IP Address | External Global IP Address | |
| 172.16.1.1 | 10.1.2.2 | 172.16.1.2 | 10.1.1.1 | |
| .... | .... | .... | .... | |
| .... | .... | .... | .... | |
| .... | .... | .... | .... | |

COMPUTER SYSTEM FOR ALLOCATING IP ADDRESS TO COMMUNICATION APPARATUS IN COMPUTER SUBSYSTEM NEWLY ADDED AND METHOD FOR NEWLY ADDING COMPUTER SUBSYSTEM TO COMPUTER SYSTEM

TECHNICAL FIELD

The present invention relates to a technique for allocating an IP address to a communication apparatus that is added to a computer system.

BACKGROUND ART

It is necessary that an IP address that is configured to communicate with a communication apparatus that has been added to a computer system (hereafter referred to as an added apparatus in some cases) is allocated to the added apparatus.

An IP address is allocated to each of the communication apparatuses by a manager in such a manner that the duplication between communication apparatuses does not occur. In other words, in the case in which there is an added apparatus, it is necessary for a manager to determine an IP address that is to be allocated to an added apparatus from IP addresses that are not yet allocated and to allocate an IP address that has been determined to an added apparatus for every added apparatus.

However, determining an IP address and allocating an IP address that has been determined for every communication apparatus are cumbersome and complicated.

An example of a server that is configured to automatically allocate an IP address to an added apparatus, for instance is a DHCP (Dynamic Host Configuration Protocol) server.

CITATION LIST

Patent Literature

PTL 1: U.S. Pat. No. 6,957,276
PTL 2: U.S. Pat. No. 7,587,518

Non Patent Literature

NPL 1: IETF RFC2131: DHCP (Dynamic Host Configuration Protocol), R. Droms, March 1997

SUMMARY OF INVENTION

Technical Problem

However, an IP address that is allocated by a DHCP server is an IP address that is dynamically determined. Consequently, in the case in which the DHCP server allocates an IP address to a server that is an example of an added apparatus (hereafter referred to as a target server) for instance, there is a possibility that an IP address that is allocated to a target server is modified when the target server is restarted. Moreover, in the case in which an IP address that is allocated to a target server is modified, the following problem (1) and/or problem (2) occur:

(1) It is necessary that the IP address management information that is managed by a management computer that is used by a manager (the information that indicates the correspondence relationship between a plurality of communication apparatuses and a plurality of IP addresses) is updated; and (2) It is necessary that the server IP address information that is managed by a communication apparatus (the information that indicates an IP address of a target server) is changed to an IP address after the modification for every communication apparatus that is coupled to a target server (for instance, a client computer).

Moreover, in the case in which a target server is restarted in the state in which a failure occurs in a DHCP server, an IP address is not allocated to the target server that has been restarted from the DHCP server, whereby a communication cannot be executed between a communication apparatus and a target server unfortunately in some cases.

By the above reasons, it is thought that an IP address that is allocated to a target server is not a dynamic IP address but a static IP address preferably.

However, in the case in which a static IP address is adopted as an IP address, other problems such as the following problems (a) to (c) may occur:

(a) It is necessary that a manager knows an IP address that can be allocated to a target server (an IP address that is not duplicated by an IP address that has already been allocated);

(b) It is necessary that a manager configures an IP address of a target server to a management computer that is configured to manage a communication apparatus in a computer system; and (c) A manager cannot configure an IP address to a target server and cannot configure an IP address of a target server to a management computer in the case in which the manager does not know an existing input environment that is associated with an IP address.

The above problems may occur even in the case in which an added apparatus is a communication apparatus of a type other than a server.

Accordingly, an object of the present invention is to allocate a static IP address to a communication apparatus that is added to a computer system without the manual cumbersome and complicated steps.

Solution of Problem

A computer system comprises a computer subsystem that is newly coupled to a communication network and an external management apparatus that is disposed outside the computer subsystem and that is coupled to the communication network. The external management apparatus manages whether or not each of M static IP addresses can be allocated. The computer subsystem includes a switch apparatus group that is at least one switch apparatus that is coupled to the communication network and N communication apparatuses (N is an integer number equal to or larger than 2 and is equal to or less than M). The N communication apparatuses are an internal management apparatus that is coupled to the switch apparatus group and that is disposed in the computer subsystem and at least one communication apparatus that is coupled to the switch apparatus and that is a communication apparatus other than the internal management apparatus. An IP address is allocated to each of the at least one communication apparatus in advance. The internal management apparatus knows an initial IP address that is an IP address that has been allocated to each of the at least one communication apparatus in advance and can communicate with the at least one communication apparatus by using at least one initial IP address via the switch apparatus group. The internal management apparatus can communicate with the external management apparatus via the switch apparatus group. The internal management apparatus transmits an IP address request that is a request of a plurality of IP addresses that are allocated to the N communication apparatuses to the external management apparatus. The external management apparatus receives the IP address request, specifies a plurality of static IP addresses that can be allocated among the M static IP addresses, transmits the IP address group information that is the information that indicates the plurality of specified static IP addresses to the internal management apparatus, and manages the plurality of specified static IP addresses as IP addresses that cannot be allocated. The internal management apparatus receives the IP address group information and allocates the plurality of static IP addresses that are indicated by the IP address group information to the internal management apparatus and at least one communication apparatus.

BRIEF DESCRIPTION OF DRAWINGS

FIG. 11 is a view showing a configuration example of an IP address management table 73.

FIG. 12 is a view showing a configuration example of an IP address table 83.

FIG. 13 is a view showing a configuration example of a NAT table 87.

FIG. 14 is a view showing a configuration example of a VLAN table 104.

FIG. 25 is a view showing a configuration example of a NAT table 87 in accordance with an embodiment 5 of the present invention.

DESCRIPTION OF EMBODIMENTS

Figure 1:
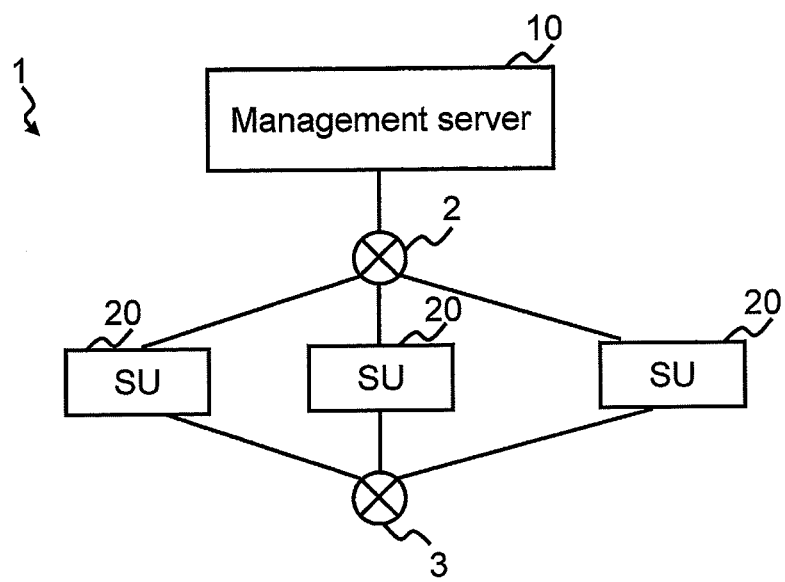
FIG. 1 is a view showing a configuration example of a computer system in accordance with an embodiment 1.

The embodiments (examples) of the present invention will be described below in detail with reference to the drawings.

In the following descriptions, while a wide variety of information will be described in the expression of "xxx table" in some cases, a wide variety of information can be represented by a data structure other than a table. In order to indicate that a data structure is not depended on, "xxx table" can also be referred to as "xxx information".

In the following descriptions, while an ID (identifier) is used as the identification information for specifying an element, a name or a number can also be used as the identification information.

In the following descriptions, the processing will be described while a "program" is handled as a subject in some cases. In the case in which the program is executed by a processor (for instance, a CPU (Central Processing Unit)) that is included in a management server or a rack manager, the processor executes the predetermined processing by using a storage resource (such as a memory) and/or a communication interface apparatus (such as a communication port) as it decides proper. Consequently, a subject of a processing can also be a processor. The processing that is described while a program is handled as a subject can also be a processing that is executed by a management server or a rack manager. Moreover, the controller can include a hardware circuit that executes a part or a whole of a processing as substitute for or in addition to a microprocessor such as a CPU. A computer program can be installed from a program source to each of the computers (such as a rack manager and a management server). The program source can be a program distribution server or a storage medium that can be read by a computer for instance.

A management computer can also be at least one computer. For instance, in the case in which a management computer indicates the information or a management computer transmits the information for an indication to a remote computer, one computer is a management computer. Moreover, in the case in which a function equivalent to a management computer is implemented by using a plurality of computers for instance, the plurality of computers is a management computer (the plurality of computers can include a computer for an indication in the case in which a computer for an indication executes an indication). In some of the following embodiments, a management server and a rack manager are both management computers.

In the following descriptions moreover, in the case in which elements of the same type are not distinguished for a description, only common signs among referential signs are used. On the other hand, in the case in which elements of the same type are distinguished for a description, referential signs (a combination of a common sign and an individual sign) are used. In the following descriptions moreover, the identification information that is added to an element is used as substitute for a referential sign.

Embodiment 1

FIG. 1 is a view showing a configuration example of a computer system in accordance with an embodiment 1.

The computer system 1 includes at least one SU (Scale Unit) 20, and a plurality of communication apparatuses in the at least one SU 20 is managed by a management server 10. The management server 10 and each of the SU 20 are coupled to each other via a management network (such as a LAN (Local Area Network)) 2 in such a manner that a packet communication can be executed. Each of the SU 20 is coupled to each other via a communication network (such as an FC (Fibre Channel) network) 3 in such a manner that a packet communication can be executed.

The management network 2 is a communication network that is used for a purpose of managing a communication apparatus in the SU 20 by the management server 10. The management network 2 is configured by a switch or a router for instance. The communication network 3 is also configured by a switch or a router for instance. The communication network 3 is a communication network that is used for a communication between communication apparatuses in different SUs 20.

The management server 10 is a server that is configured to manage the whole of the computer system 1. The SU 20 is a computer subsystem (an apparatus group) that is configured by a server, a storage, and a network apparatus that have already been coupled for instance.

Figure 2:
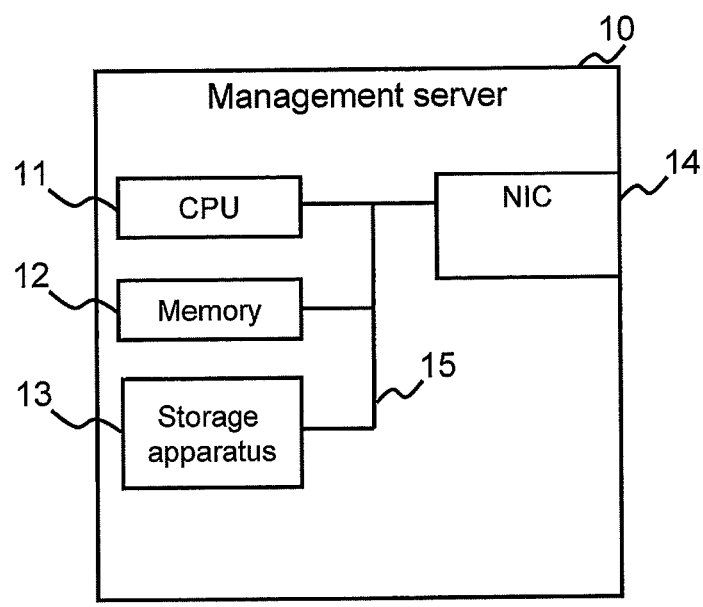
FIG. 2 is a view showing a configuration example of a management server 10.

FIG. 2 is a view showing a configuration example of the management server 10.

The management server 10 is provided with a CPU (Central Processing Unit) 11, a memory 12, a storage apparatus 13, a NIC 14, and a bus 15. A communication medium that is configured to couple the CPU 11, the memory 12, the storage apparatus 13, and the NIC 14 to each other is not restricted to the bus 15, and a communication medium of other type can also be adopted. This is not restricted to the management server 10. This is similar to a communication apparatus of other type (such as at least one type of apparatuses of a rack manager 22, a server 23, and a management switch 25).

The CPU 11 executes a program that has been stored into the memory 12. The memory 12 stores a program and data that are executed by the CPU 11. The storage apparatus 13 is a physical storage apparatus that is configured to store data, and is an HDD (Hard Disk Drive) or an SSD (Solid State Drive) for instance. The NIC (Network Interface Card) 14 is a type of a communication interface apparatus, and is an expansion card that is configured to transmit and receive a packet via a network cable. The NIC 14 is coupled to the management network 2. The bus 15 is a transmission path that is configured to transmit and receive a signal between the CPU 11, the memory 12, the storage apparatus 13, and the NIC 14.

As described later, the management server 10 manages an IP address that has been allocated to a communication apparatus in the SU 20. In the case in which the SU 20 is newly added to the computer system 1, the management server 10 notifies each of communication apparatuses in the added SU 20 of an IP address that is to be allocated by communicating with the communication apparatus in the added SU 20.

Figure 3:
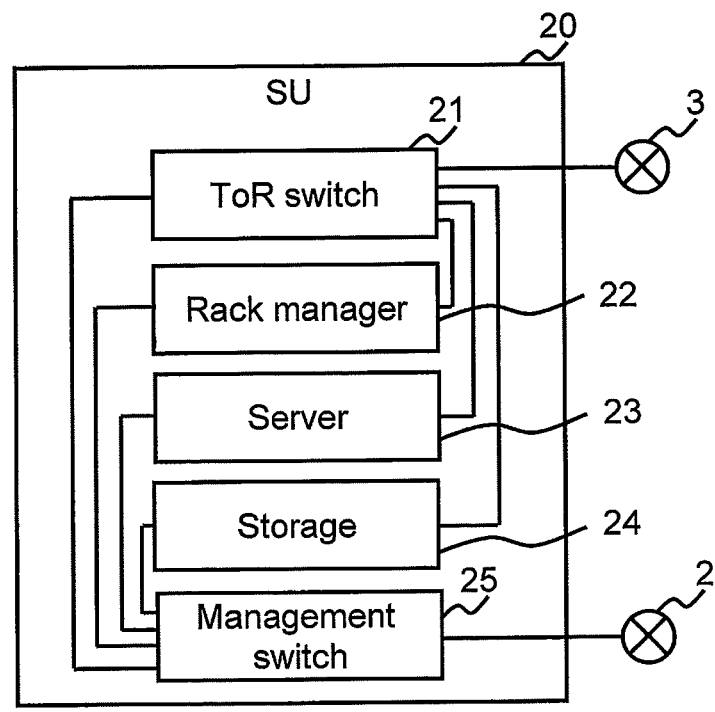
FIG. 3 is a view showing a configuration of an SU 20.

FIG. 3 is a view showing a configuration of the SU 20.

The SU 20 is provided with a plurality of communication apparatuses and a rack manager 22 that is coupled to the plurality of communication apparatuses. As the plurality of communication apparatuses, which include a ToR (Top of Rack) switch 21, a server 23, a storage 24, and a management switch 25.

The server 23 and the storage 24 are coupled to the ToR switch 21 and the management switch 25 via a management cable. The adding of a communication apparatus to the computer system 1 and the removal of a communication apparatus from the computer system 1 are not executed in a unit of a communication apparatus but executed in a minimum unit of the SU 20.

The ToR switch 21 is a packet relay apparatus that is configured to couple a communication apparatus in the SU 20 to the communication network 3. The communication between SUs 20 via the communication network 3 is executed via the ToR switch 21.

The rack manager 22 is a computer that is configured to manage each of the communication apparatuses in the SU 20.

The server 23 is a computer that is configured to execute an application program. The server 23 receives a command from a communication apparatus inside or outside the SU 20 that is provided with the server 23, and processes the command. In the case in which the command is a write command or a read command, the server 23 transmits an I/O (Input/Output) command based on the write command or the read command to the storage 24.

The storage 24 is a physical storage apparatus that is configured to store the data that is conforms to an I/O command from the server 23 and a computer program (such as an application program and an OS (Operating System)) that is executed by the server 23. The storage 24 can be a single storage medium (such as an HDD and an SSD) and a storage apparatus that is provided with a plurality of storage media (such as a disk array apparatus).

The management switch 25 is a packet relay apparatus that is configured to couple each of the communication apparatuses in the SU 20 to the management network 2.

The SU 20 shown in the figure can be provided with or is not provided with at least one type of communication apparatuses of the ToR switch 21, the rack manager 22, the server 23, the storage 24, and the management switch 25. Moreover, the SU 20 can be provided with a plurality of communication apparatuses of at least one type of the plurality of types of communication apparatuses.

Figure 4:
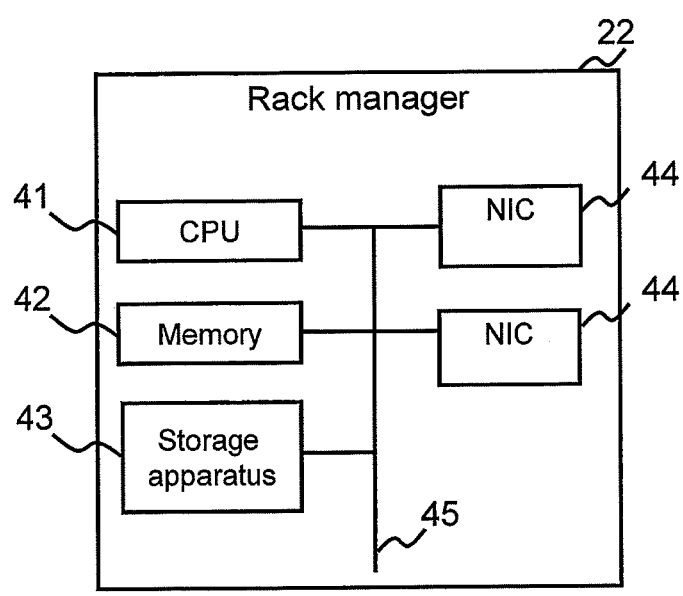
FIG. 4 is a view showing a configuration example of a rack manager 22.

FIG. 4 is a view showing a configuration example of the rack manager 22.

The rack manager 22 is provided with a CPU 41, a memory 42, a storage apparatus 43, a NIC 44, and a bus 45. The CPU 41 is coupled to the memory 42, the storage apparatus 43, and the NIC 44 via the bus 45. Since the configuration of the rack manager 22 is almost equivalent to that of the management server 10 described above, the descriptions of the configuration elements of the rack manager 22 are omitted.

A function that is configured to manage each of the communication apparatuses in the SU 20 can be implemented by executing a program that has been stored into the memory 42 by the CPU 41. The program can be stored into any of the communication apparatuses (such as a memory of the storage 24, the management switch 25, the server 23, and the ToR switch 21) as substitute for the rack manager 22, and can be executed by a processor in any of the communication apparatuses. In other words, any of the communication apparatuses can be operated as the rack manager 22.

Figure 5:
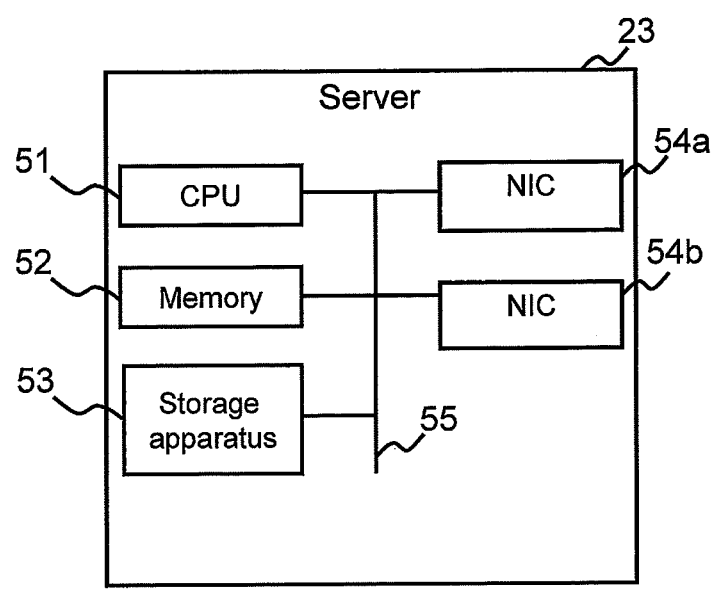
FIG. 5 is a view showing a configuration example of a server 23.

FIG. 5 is a view showing a configuration example of the server 23.

The server 23 is provided with a CPU 51, a memory 52, a storage apparatus 53, a NIC 54, and a bus 55. The CPU 41 is coupled to the memory 42, the storage apparatus 43, and the NIC 44 via the bus 45. Since the configuration of the server 23 is almost equivalent to that of the management server 10 described above, the descriptions of the configuration elements of the server 23 are omitted. The NIC 54 is configured by a NIC 54a that is configured to be coupled to the communication network 3 and a NIC 54b that is configured to be coupled to the management network 2. The NIC 54a and the NIC 54b can also be configured in an integrated manner, and the ToR switch 21 and the management switch 25 can also be configured in an integrated manner. In this case, a VLAN (Virtual LAN (Local Area Network)) that corresponds to the ToR switch 21 and a VLAN that corresponds to the management switch 25 can also be configured to a single switch.

Figure 6:
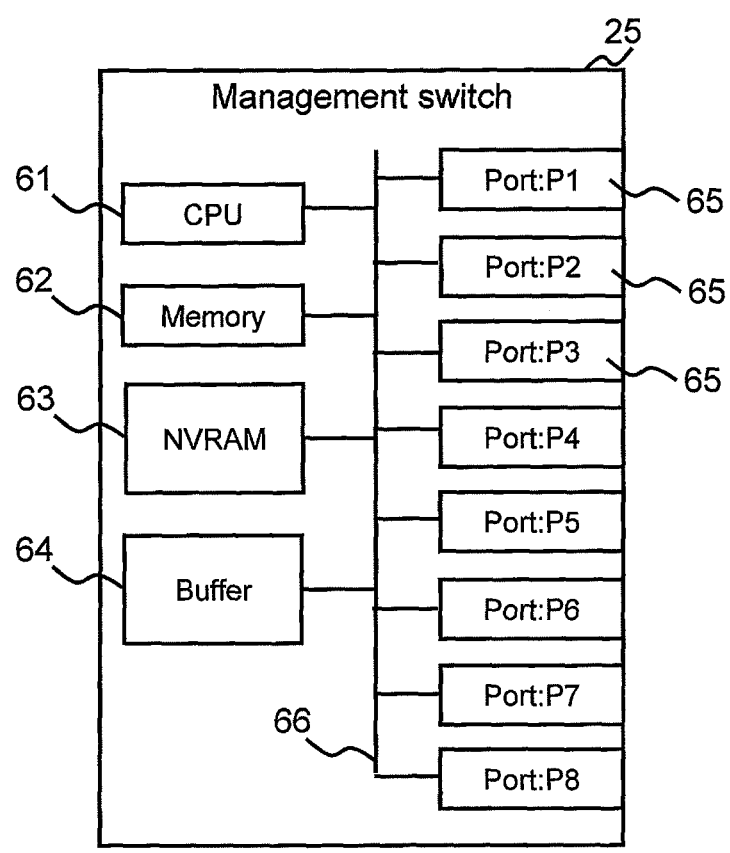
FIG. 6 is a view showing a configuration example of a management switch.

FIG. 6 is a view showing a configuration example of the management switch 25.

The management switch 25 is provided with a CPU 61, a memory 62, an NVRAM (Non Volatile RAM) 63, a buffer 64, and a plurality of ports 65, and a bus 66.

The CPU 61 executes a program that has been stored into the memory 62. The memory 62 is a main storage memory for instance, and stores a program and data that are executed by the CPU 61. The NVRAM 63 is an auxiliary storage memory for instance, and stores the data that has been stored into the memory 62 on a long term basis. The buffer 64 is a storage region that is configured to store a packet that is transmitted or received at the port 65 on a temporary basis. The port 65 is an interface that is configured to transmit or receive a packet. The port 65 can be a physical port or a logical port.

Figure 7:
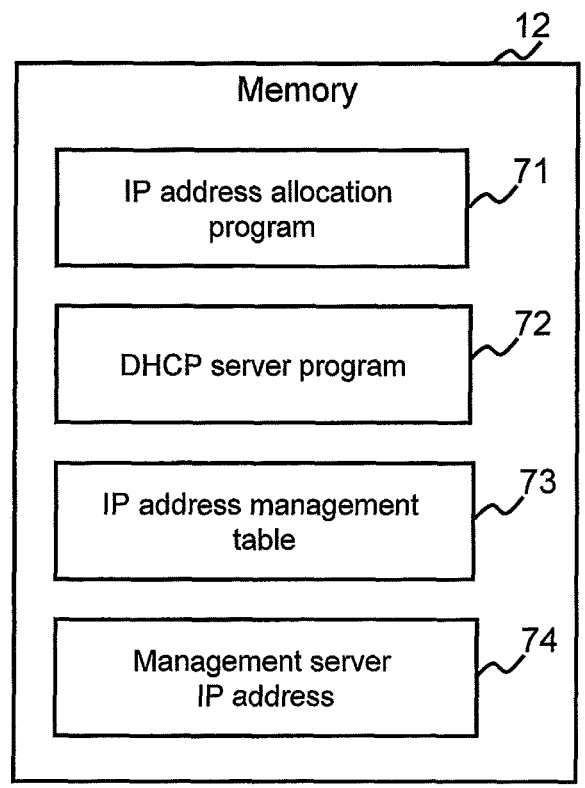
FIG. 7 is a view showing an example of a program and the information that are stored by a memory 12 of the management server 10.

FIG. 7 is a view showing an example of a program and the information that are stored by the memory 12 of the management server 10.

The memory 12 of the management server 10 stores an IP address allocation program 71, a DHCP server program 72, an IP address management table 73, and a management server IP address 74.

In the case in which the IP address allocation program 71 receives an IP address allocation request that is a request of allocating an IUP address to a communication apparatus (hereafter referred to as an added apparatus) that configures an SU (hereafter referred to as an added SU) 20 that has been added to the computer system from the rack manager 22, the IP address allocation program 71 executes the following processing:

determines an IP address that is suitable for an added apparatus based on the IP address management table 73; and notifies the rack manager 22 of the suitable IP address that has been determined.

The DHCP server program 72 is a program that is configured to notify an IP address in accordance with a request from a DHCP client program 83 that is executed by the rack manager 22 in the added SU 20. The IP address is an address that is used for a communication at an initial stage between the rack manager 22 and the management server 10. By using the IP address, a new IP address is allocated to each of the added apparatuses. It is also possible that the DHCP server program 72 is not disposed. In the case in which the DHCP server program 72 is not disposed, a configuring work of an IP address that is used for a communication at an initial stage described above is carried out manually by a manager.

The IP address management table 73 is a table that is provided with the information that indicates an IP address that has been allocated to each of the communication apparatuses in the computer system 1.

The management server IP address 74 is the information that indicates an IP address that has been allocated to the NIC 14 of the management server 10.

Figure 8:
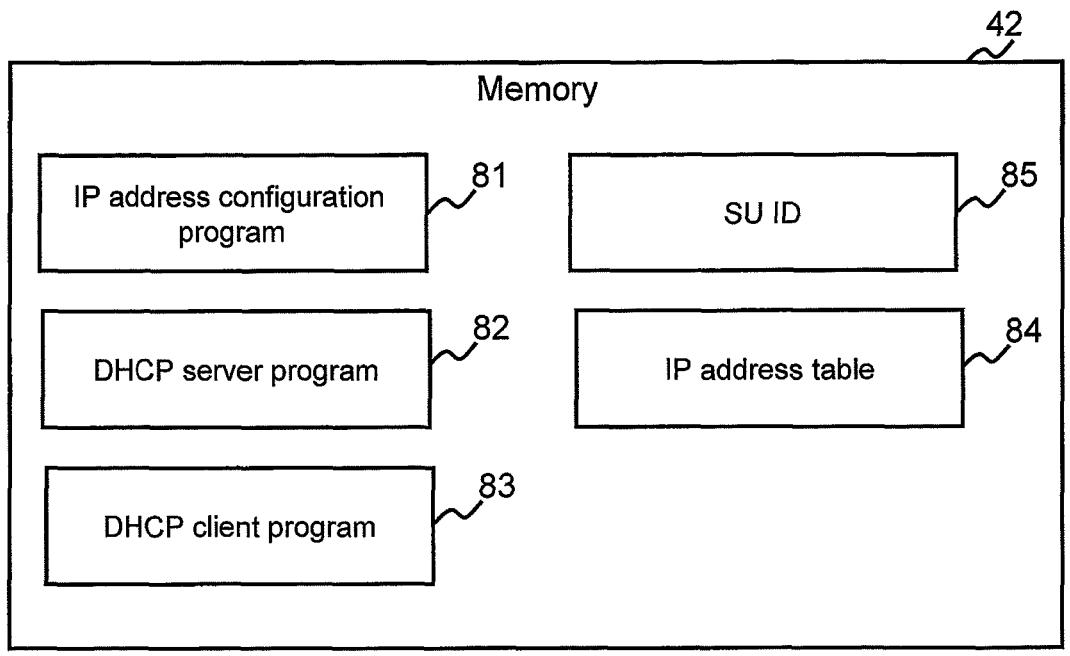
FIG. 8 is a view showing an example of a program and the information that are stored by a memory 42 of the rack manager 22.

FIG. 8 is a view showing an example of a program and the information that are stored by the memory 42 of the rack manager 22.

The memory 42 of the rack manager 22 stores an IP address configuration program 81, a DHCP server program 82, a DHCP client program 83, an IP address table 84, and an SU ID 85.

The IP address configuration program 81 is a program that is configured to execute the following processing in the case in which the IP address configuration program 81 adds an SU 20 to the computer system 1:

(*) issues a request of a suitable IP address that is to be allocated to an added apparatus to the management server 10; and (*) configures the IP address that has been notified by the management server 10 to each of the added apparatuses.

The DHCP server program 82 is a program that is configured to notify an IP address in accordance with a request from a DHCP client program 83 that is executed by the rack manager 22 in the added SU 20. The IP address is an address that is used for a communication at an initial stage between the rack manager 22 and the management server 10.

The DHCP client program 83 is a program that is configured to request an IP address that is to be allocated to the NIC 44 of the rack manager 22 for instance to the DHCP server program 72 that is executed by the management server 10. The IP address is also an address that is used for a communication at an initial stage between the rack manager 22 and the management server 10. It is also possible that the DHCP server program 82 and the DHCP client program 83 are not disposed.

The IP address table 84 is a table that is provided with the information that indicates an IP address that has been allocated to the NIC 44 that is included in the rack manager 22.

The SU ID 85 is an ID of the SU 20 that stores the ID 85.

Figure 9:
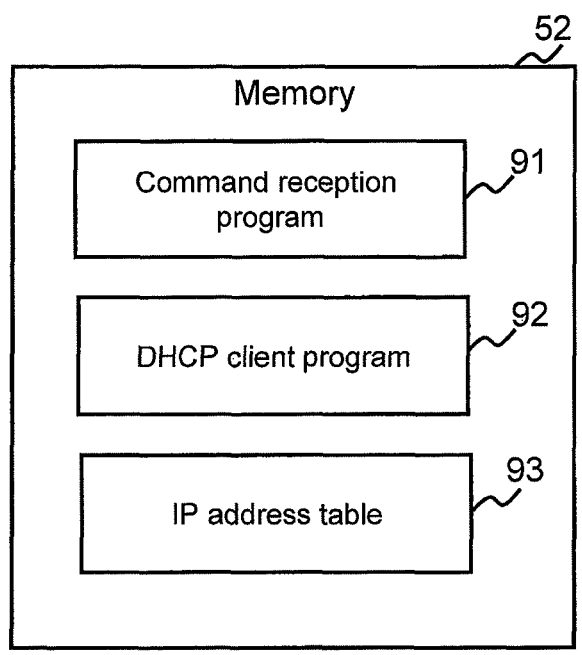
FIG. 9 is a view showing an example of a program and the information that are stored by a memory 52 of the server 23.

FIG. 9 is a view showing an example of a program and the information that are stored by the memory 52 of the server 23.

The memory 52 of the server 23 stores a command reception program 91, a DHCP client program 92, and an IP address table 93.

The command reception program 91 is a program that is configured to receive and execute a command that has been transmitted from the rack manager 22.

The DHCP client program 92 is a program that is configured to request an IP address that is to be allocated to the NIC 54 that is included in the server 23 to the DHCP server program 82 that is executed by the rack manager 22. It is also possible that the DHCP client program 92 is not disposed.

The communication apparatus of other kind in addition to the server 23 can also be provided with the command reception program 91, the DHCP client program 92, and the IP address table 93. A processing that is similar to a processing that is executed in the case in which an IP address is configured to the server 23 can also be executed by a communication apparatus of other kind.

Figure 10:
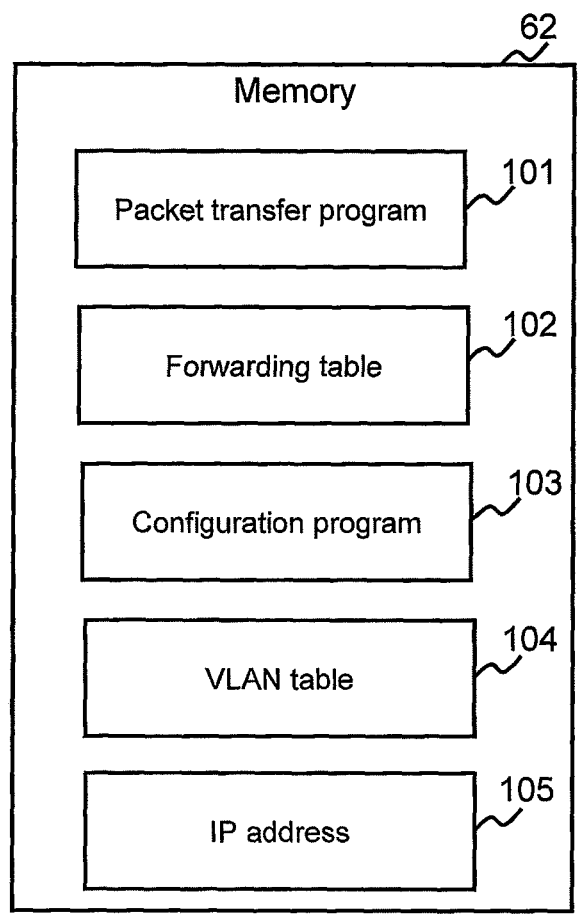
FIG. 10 is a view showing an example of a program and the information that are stored by a memory 62 of the management switch 25.

FIG. 10 is a view showing an example of a program and the information that are stored by the memory 62 of the management switch 25.

The memory 62 of the management switch 25 stores a packet transfer program 101, a forwarding table 102, a configuration program 103, a VLAN table 104, and a plurality of IP addresses 105.

The packet transfer program 101 is a program that is configured to execute the following processing based on the forwarding table 102:

(*) searches a port 65 that is a transfer destination of the received packet and transfers the received packet to the found port 65 of a transfer destination; and (*) updates the forwarding table 102 based on a MAC address that is a transmission source of the received packet.

The forwarding table 102 is a table that is provided with the information that indicates the correspondence relationship between the MAC address and a transfer destination port.

The configuration program 103 is a program that is configured to manage a VLAN. The configuration program 103 uses a VLAN table 104 (see FIG. 14) for managing a VLAN.

The VLAN table 104 is a table that indicates the correspondence relationship between a VLAN and a port.

The plurality of IP addresses 105 is IP addresses that have been allocated to a plurality of ports 65 that are included in the management switch 25.

FIG. 11 is a view showing a configuration example of an IP address management table 73.

The IP address management table 73 is provided with an IP address 111, a MAC address 112, an SU ID 113, and a state 114 for every IP address that is managed by the management server 10 (a management IP address in the description of FIG. 11).

The IP address 111 is the information that indicates a management IP address.

The MAC address 112 is the information that indicates a MAC address of a communication apparatus to which a management IP address has been allocated. In the case in which a communication apparatus has not been allocated, it is possible that the MAC address 112 is not registered to the table 73.

The SU ID 113 is an ID of the SU 20 to which a communication apparatus to which a management IP address has been allocated belongs.

The state 114 is the information that indicates a state of a management IP address:

(*) in the case in which a management IP address has been allocated to an added apparatus, a value of the state 114 is "coupled";

(*) in the case in which a management IP address has already been notified an added SU 20 of and the management IP address has not been allocated to a communication apparatus in the added SU 20, a value of the state 114 is "under configuration"; and (*) in the case in which a management IP address has not been notified an SU 20, a value of the state 114 is "unallocated".

FIG. 12 is a view showing a configuration example of an IP address table 83.

The IP address table 83 is provided with an I/F ID 121, a NIC ID 122, an IP address 123, and a VLAN tag 124 for every I/F (interface).

The I/F ID 121 is an ID of an I/F (interface). Although the I/F is a virtual end point of an IP communication that is identified by an IP address (a virtual communication interface apparatus that is configured to the NIC 44), the I/F can also be a physical communication interface apparatus. At least one I/F can be configured to one NIC.

The NIC ID 122 is an ID of a NIC to which an I/F has been configured.

The IP address 123 is the information that indicates an IP address that is allocated to an I/F.

The VLAN tag 124 is the information that indicates a tag that is added to a packet that is transmitted by an I/F. In the case in which a tag is not added, it is possible that a value of the VLAN tag 124 is "none". An I/F can communicate with a VLAN that corresponds to a VLAN tag that has been added to the I/F. More specifically, the I/F to which a VLAN tag "1" has been added can communicate via the VLAN 1 and cannot communicate via other VLAN.

The VLAN is a virtual LAN that has been coupled to the port 65 of the management switch 25. At least one VLAN can be formed in the management switch 25.

FIG. 14 is a view showing a configuration example of a VLAN table 104.

The VLAN table 104 is provided with a VLAN 141 and ports (P1 to P8) 142. The VLAN table 104 is provided with the information that indicates a port 65 and a VLAN to which the port 65 belongs and the information that indicates whether or not a packet that is transmitted from the port 65 is VLAN tagged.

The VLAN table 104 is the information for identifying a VLAN, and is a number as a VLAN tag for instance. The ports (P1 to P8) 142 are the information that indicates which VLAN each of the ports belongs to.

(*) "U" represents that a VLAN is not a tagged VLAN (a VLAN in which a tag is inserted to a packet that is input or output). In the example of FIG. 14, a VLAN2 is an untagged VLAN (that is, not a tagged VLAN) and the ports P1 to P3, P5 and P6 belong to the VLAN2; and (*) "T" represents that a VLAN is a tagged VLAN. In the example of FIG. 14, a VLAN1 and a VLAN3 are tagged VLANs, the ports P1 to P4 belong to the VLAN1, and the ports P5 to P8 belong to the VLAN3.

One port 65 belongs to a plurality of VLANs in some cases. For instance, the port P1 belongs to both of the VLAN1 and the VLAN2 as described above. A tag "1" is inserted to a packet that is transmitted from the port P1 to the VLAN1, and a tag is not inserted to a packet that is transmitted from the port P1 to the VLAN2.

The SU 20 described above is a computer system of one type and can be operated in a stand alone manner. For instance, the server 23 can receive an I/O request from a client computer not shown, and can execute an I/O of data to the storage 24 via the management switch 25 in accordance with the I/O request. The rack manager 22 can manage each of the communication apparatuses 21, 23, 24, and 25 in the SU 20.

A computer system 1 of a large scale that is provided with a plurality of the SUs 20 can be constructed. In this case, the SU 20 is a computer subsystem for the computer system 1.

Before the SU 20 is added to the computer system 1, the rack manager 22 in the SU 20 is provided with an authority for managing the communication apparatuses 21, 23, 24, and 25. However, after the SU 20 is added to the computer system 1, an authority for managing the communication apparatuses 21, 23, 24, and 25 is transferred from the rack manager 22 in the added SU 20 to the management server 10. In other words, the management server 10 manages a plurality of communication apparatuses in at least one SU 20 for the computer system 1 in an integrated fashion in the present embodiment.

With reference to FIG. 15 to FIG. 18, the following describes an example of a flow of a processing that is executed in the case in which an SU 20 is added to the computer system 1, more specifically, an example of a flow of a processing in which the above described management authority is transferred from the rack manager 22 to the management server 10. An SU that is added to the computer system 1 is referred to as an added SU in some cases. Moreover, a communication apparatus inside an added SU is referred to as an internal apparatus in some cases, and a communication apparatus outside an added SU is referred to as an external apparatus in some cases.

Figure 15:
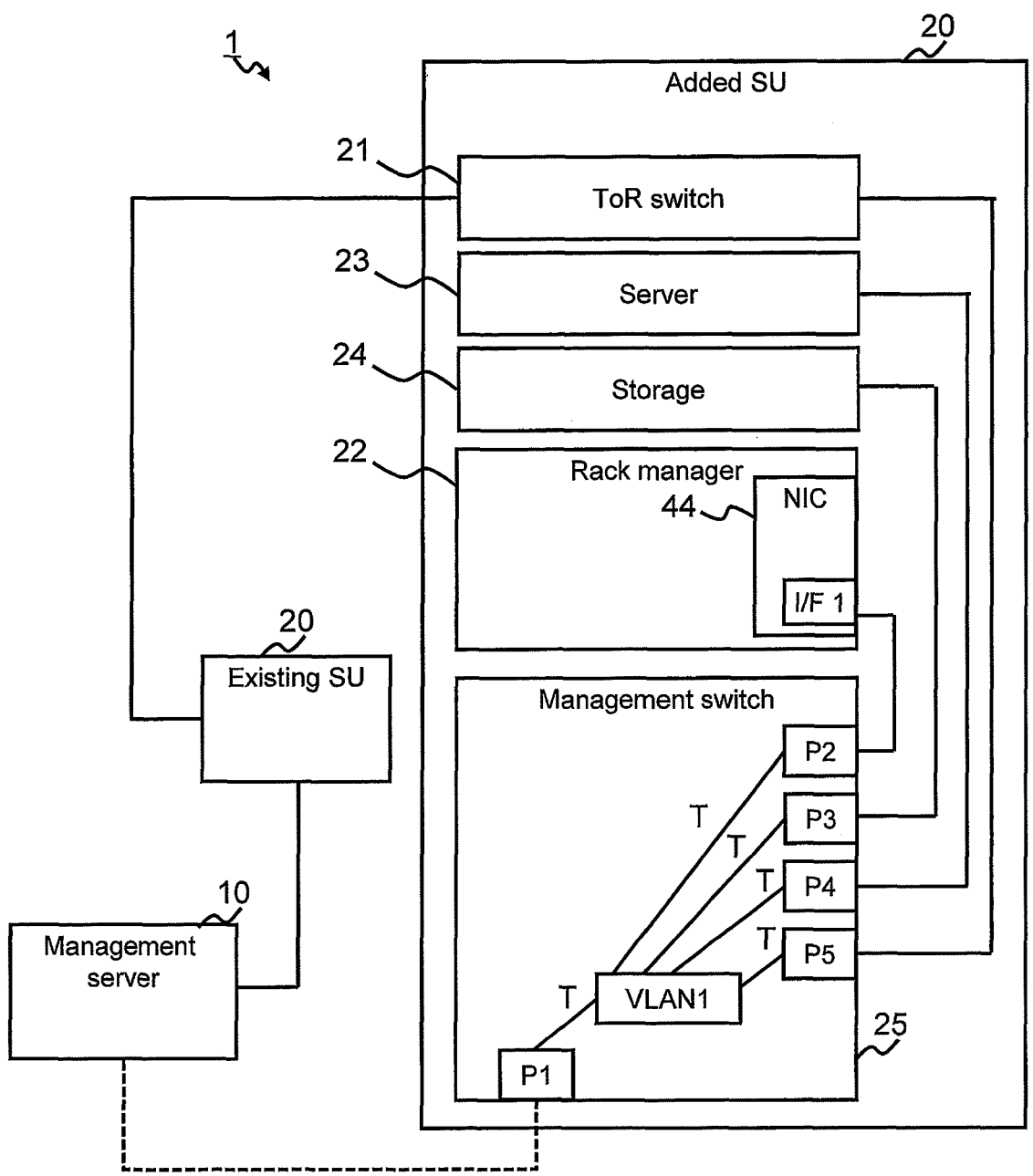
FIG. 15 is a view showing a first part of an example of a processing flow that is executed in the case in which the SU 20 is added to the computer system 1.

As shown in FIG. 15, the computer system 1 is provided with at least one existing SU 20, and a communication apparatus (such as the server 23 and the storage 24) in the existing SU 20 is a management target of the management server 10.

As shown in FIG. 15, an SU 20 is newly added to the computer system 1. More specifically, the ToR switch 20 of the SU 20 is coupled to the network 3, and the port P1 of the management switch 5 is coupled to the network 2. The SU 20 is initially in the following state:

(*) The VLAN1 is configured to the management switch 25. The VLAN1 is a tagged VLAN. The ports P1 to P5 belong to the VLAN1. The port P1 is a port that is coupled to the management server 10. The port P2 is a port that is coupled to the rack manager 22. The ports P3 to P5 are ports that are used to communicate with a plurality of internal apparatuses (a plurality of internal apparatuses 21, 23, and 24 other than the management switch 25 and the rack manager 22).

(*) The I/F 1 is configured to the NIC 44 that is included in the rack manager 22. The I/F 1 is a virtual communication interface apparatus.

(*) An initial IP address is allocated to the I/F 1. In addition, an initial IP address is allocated to a plurality of communication apparatuses 21 and 22. An initial IP address is an IP address that has been assigned in advance (for instance, from the beginning of a shipment), and is an IP address that is used to communicate with the communication apparatuses 21, 23, and 24 by the rack manager 22. The storage resource (such as the memory 42) of the rack manager 22 has stored the information that indicates the initial IP address of a plurality of internal apparatuses 21 to 24 in advance. The VLAN1, the rack manager 22, and the plurality of internal apparatuses 21, 23, and 24 belong to the same subnet. More specifically, a network address of the initial IP address of the I/F 1 is equivalent to a network address of the initial IP address of the internal apparatuses 21, 23, and 24. By using the initial IP address of the rack manager 22 and the initial IP address of the internal apparatuses 21, 23, and 24, the rack manager 22 can communicate with the internal apparatuses 21, 23, and 24 via the VLAN1.

(*) Even in the case in which the port 1 of the management switch 25 in the added SU 20 is coupled to the network 2, the added SU 20 is not yet coupled to the management server 10 in such a manner that the added SU 20 can communicate with the management server 10.

Figure 16:
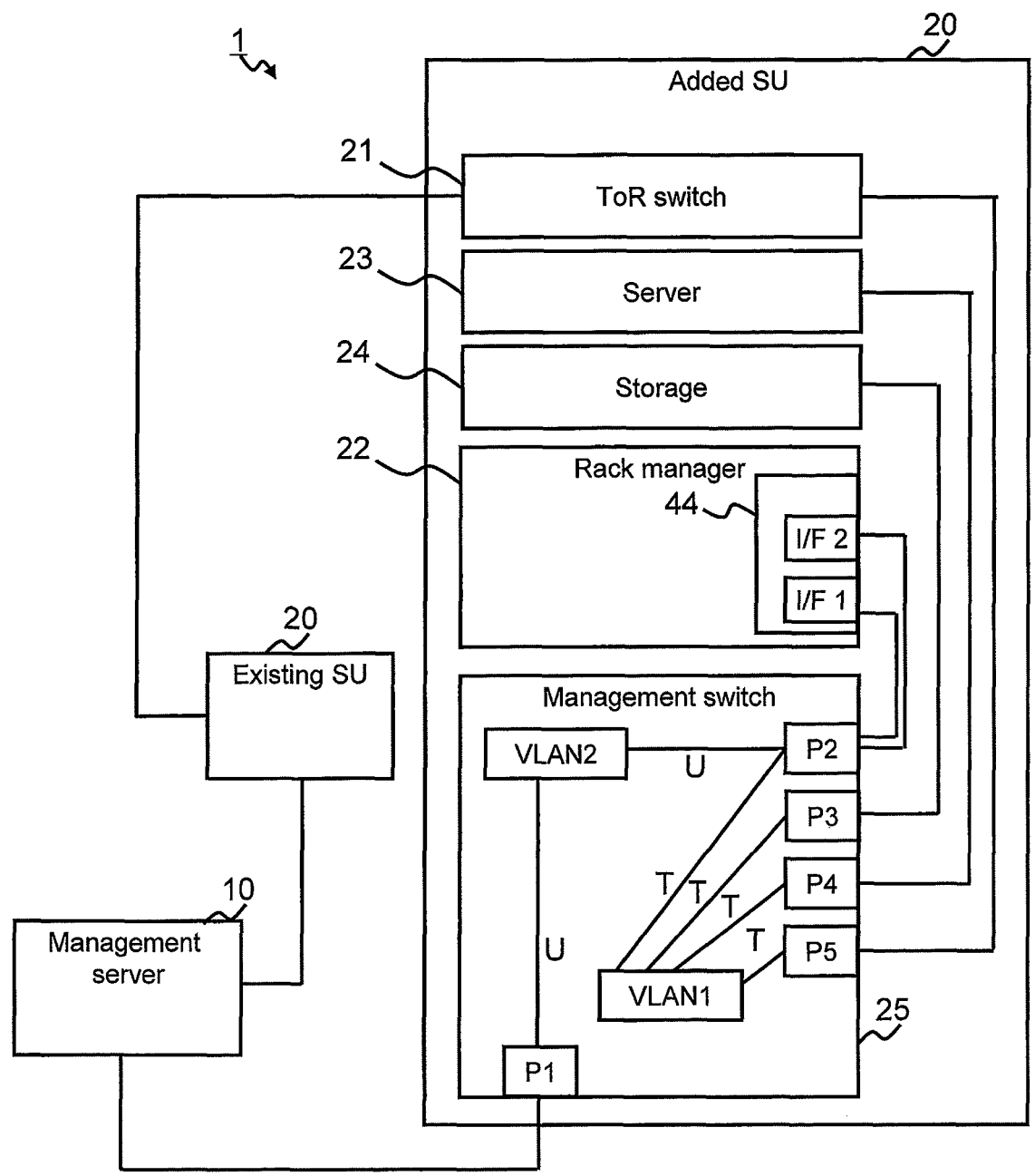
FIG. 16 is a view showing a second part of an example of a processing flow that is executed in the case in which the SU 20 is added to the computer system 1.

As shown in FIG. 16, the added SU 20 can be coupled to the management server 10 in such a manner that the added SU 20 can communicate with the management server 10. More specifically, the following processing is executed for instance:

(*) The rack manager 22 uncouples the port P1 from the VLAN1. The coupling and uncoupling of a port and a VLAN are executed by transmitting a coupling modification command to the management switch 25 by the rack manager 22 and by executing the coupling modification command by the management switch 25 for instance. The coupling modification command is a command for modifying a correspondence relationship between a port and a VLAN. In the case in which the coupling modification command is executed, the management switch 25 updates the VLAN table 104 for instance. By this configuration, "T" is deleted from a cell that corresponds to the port P1 and the VALN1 for the VLAN table 104.

(*) The rack manager 22 configures the VLAN2 to the management switch 25. By this configuration, a line that corresponds to the VLAN2 is added to the VLAN table 104. The VLAN2 is an untagged VLAN (that is, a VLAN that is not a tagged VLAN). The VLAN2 can be configured to the management switch 25 in advance similarly to the VLAN1. Moreover, the VLAN2 can also be a tagged VLAN to which a tag that is different from a tag that is assigned in a communication via the VLAN1 and a VLAN3 described later is assigned. However, unlike the VLAN1 and the VLAN3 described later, the VLAN2 is not a VLAN that is used for a communication between internal apparatuses but a VLAN that is used for a communication with an external apparatus (the management server 10). Consequently, it is preferable that the VLAN2 is an untagged VLAN like the present embodiment.

(*) The rack manager 22 makes the port P1 and the port P2 to belong to the VLAN2. By this configuration, "U" is set to a cell that corresponds to the port P1, the port P2, and the VALN2 for the VLAN table 104. The port P2 belongs to both of the VLAN1 and the VLAN2.

(*) The rack manager 22 configures the I/F 2 to the NIC 44. The I/F 2 is a virtual communication interface apparatus similarly to the I/F 1.

(*) An IP address of the I/F 2 is allocated to the I/F 2. The IP address can be an IP address that has been input by a human person such as a manager or can be an IP address that has been input automatically (for instance, an IP address that has been input in accordance with a technique of the DHCP). The I/F 2 and an IP address of the I/F 2 can be configured to the rack manager 22 in advance similarly to the I/F 1 and an IP address of the I/F 1. Moreover, a configuration of an IP address to the I/F 2 (and the I/F 3 described later) can be carried out by an execution of a command or can be carried out by a rewrite of a configuration file and a restart of an I/F. The configuration file is a file that is used in a communication by the rack manager 22, and is a file that has been stored into a storage resource (such as the storage apparatus 43) in the rack manager 22.

(*) The storage resource (such as the memory 42) of the rack manager 22 stores the information that indicates an IP address of the management server 10. The IP address can be an IP address that has been input by a human person such as a manager or can be an IP address that has been input automatically (for instance, an IP address that has been input in accordance with a technique of the DHCP).

By using the IP address of the I/F 2 and the IP address of the management server 10, the rack manager 22 can communicate with the management server 10 via the VLAN2.

Figure 17:
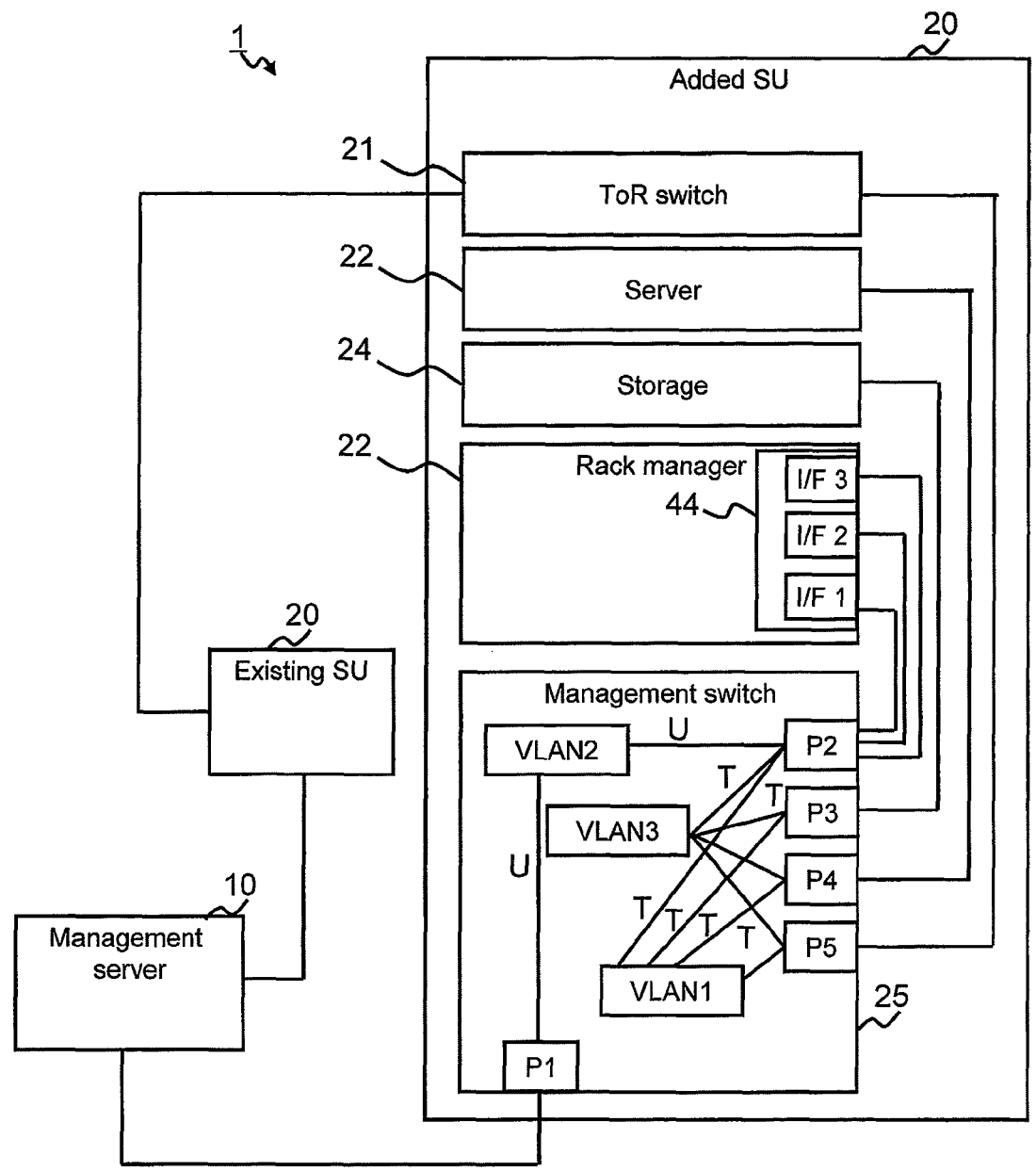
FIG. 17 is a view showing a third part of an example of a processing flow that is executed in the case in which the SU 20 is added to the computer system 1.

As shown in FIG. 17, the management server 10 transmits a plurality of appropriate IP addresses to the rack manager 22, and the rack manager 22 configures the plurality of appropriate IP addresses to the I/F 3 and the internal apparatuses 21, 23, and 24. By this configuration, the management server 10 and the internal apparatuses 21, 23, and 24 can communicate with each other. More specifically, the following processing is executed for instance:

(*) The rack manager 22 configures the VLAN3 to the management switch 25. By this configuration, a line that corresponds to the VLAN3 is added to the VLAN table 104.

(*) The VLAN2 and the VLAN3 belong to the same subnet. In other words, a network address of an IP address that is used for a communication via the VLAN2 is equivalent to a network address of an IP address that is used for a communication via the VLAN3 (an appropriate IP address that is transmitted from the management server 10 and that is configured to each of the internal apparatuses by the rack manager 22). This is because the internal apparatus is managed later by the management server 10 as substitute for the rack manager 22, and therefore it is necessary that a subnet to which the management server 10 belongs (a subnet to which the VLAN2 belongs) is equivalent to a subnet to which the internal apparatus belongs (a subnet to which the VLAN3 belongs). However, it is not preferable that a plurality of internal apparatuses is initially coupled to the VLAN2 to which the external apparatus (the management server 10) is coupled. This is because in the case in which the internal apparatus initially belong to the VLAN2, the duplication of IP addresses occurs between the internal apparatus and the external apparatus. In the case in which the VLAN3 is disposed, even if the duplication of IP addresses occurs the internal apparatus and the external apparatus, the rack manager 22 can distinguish and transmit packets in such a manner that "a packet that is transmitted without a VLAN tag is for the external apparatus" and "a packet that is transmitted with a VLAN tag is for the internal apparatus".

(*) The rack manager 22 configures the I/F 3 in the NIC 44. The I/F 3 is a virtual communication interface apparatus similarly to the I/F 1 and the I/F 2.

(*) The rack manager 22 transmits an appropriate IP request from the I/F 2. The appropriate IP request is transmitted to the management server 10 via the VLAN2 and the port P1. The appropriate IP request is a request of an allocation of an appropriate IP address. The request can include the information that indicates the required number of appropriate IP addresses. The appropriate IP address is a static IP address, and is an IP address that is used to communicate with the communication apparatuses 21, 23, and 24 by the management server 10.

(*) The management server 10 receives the appropriate IP request and transmits a plurality of appropriate IP addresses to the rack manager 22 in response to the request. In accordance with the example shown in FIG. 17, five appropriate IP addresses are necessary. This is because a plurality of appropriate IP addresses is allocated to the I/F 3 and the communication apparatuses 21, 23, 24, and 25.

(*) The management server 10 receives a plurality of appropriate IP addresses that have been transmitted from the management server 10 by the I/F 2 via the port P1, the VLAN2, and the port P2.

(*) The rack manager 22 couples the port P2 to which the I/F 1 and the I/F 2 are coupled to the VLAN3. Moreover, the rack manager 22 couples the ports P3 to P5 to which the internal apparatuses 21, 23, and 24 are coupled to the VLAN3. By this configuration, "T" is set to a cell that corresponds to the ports P2 to P5 and the VALN3 for the VLAN table 102.

(*) The rack manager 22 logs in the management switch 25 from the I/F 1. Since the I/F 1 is an I/F that is used for a communication with the internal apparatus, a login is executed from the I/F 1.

(*) After the rack manager 22 logs in the management switch 25, the rack manager 22 configures the above plurality of appropriate IP addresses to the I/F 3 and the internal apparatuses 21, 23, 24, and 25 via the VLAN1. By this configuration, the IP address of the internal apparatuses 21, 23, 24, and 25 is modified from an initial IP address to an appropriate IP address. In the case in which the rack manager 22 transmits an IP configuration command from the I/F 1 to the internal apparatus and the internal apparatus executes the IP configuration command, the IP address of the internal apparatus is modified from an initial IP address to an appropriate IP address. The IP configuration command is a command for configuring an IP address.

(*) The rack manager 22 checks whether or not a communication apparatus in the added SU 20 is coupled to the rack manager 22 in such a manner that the added SU 20 can communicate with the rack manager 22 (hereafter referred to as a coupling check) from the I/F 3 via the port 2 and the VLAN3 for every internal apparatus to which an appropriate IP address has been configured.

(*) For the internal apparatus in which a result of the above coupling check is positive, the rack manager 22 transmits an allocation completion notice of an IP address (a notice of that an appropriate IP address has been configured) to the management server 10 from the I/F 2 via the port 2 and the VLAN2.

(*) For the internal apparatus in which a result of the above coupling check is negative, the rack manager 22 can notify the management server 10 of a configuration modification failure from the I/F 2 via the port 2 and the VLAN2. Moreover, for the internal apparatus in which a result of the above coupling check is negative, the rack manager 22 can configure an appropriate IP address that has been configured to the internal apparatus to the internal apparatus again, and can execute the above coupling check for the internal apparatus again. In the case in which a result of the above coupling check is negative even in the case in which the processing is executed a predetermined number of times (for instance at least one time) for instance, the rack manager 22 can notify the management server 10 of a configuration modification failure from the I/F 2 via the port 2 and the VLAN2.

(*) The storage resource (such as the memory 12) of the management server 10 has stored the information that indicates a plurality of appropriate IP addresses that has been transmitted to the rack manager 22 for an IP address of the I/F 2 of the rack manager 22 in the added SU 20 for instance. The management server 10 writes the information that indicates whether or not a configuration modification completion of an IP address is received for every appropriate IP address into the storage resource (such as the memory 12) in the management server 10. In the case in which an allocation completion notice of an IP address is received, the information that indicates a configuration modification completion is stored into the storage resource (such as the memory 12) in the management server 10 for the internal apparatus that corresponds to the allocation completion notice. In the case in which a configuration modification failure is received, the information that indicates a configuration modification failure is stored into the storage resource (such as the memory 12) in the management server 10 for the internal apparatus that corresponds to the configuration modification failure. The management server 10 can decide another appropriate IP address for the internal apparatus that corresponds to the configuration modification failure, and can transmit an IP configuration command for configuring the appropriate IP address to the internal apparatus that corresponds to the configuration modification failure to the rack manager 22. The IP configuration command is received by the I/F 2 via the port P1, the VLAN2, and the port P2. The rack manager 22 configures another appropriate IP address to the internal apparatus that corresponds to the configuration modification failure in response to the IP configuration command, and executes the above check for the internal apparatus.

Figure 18:
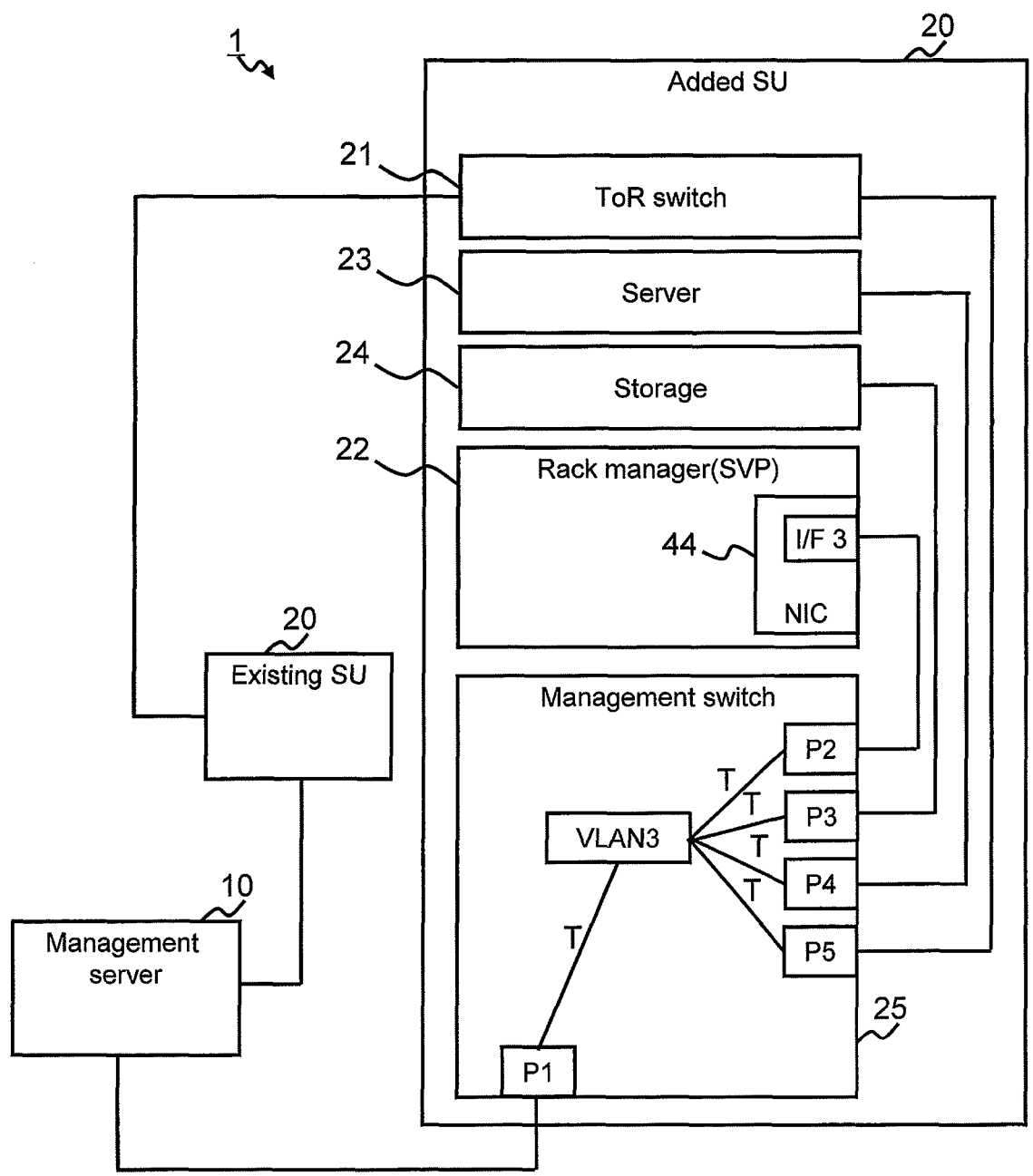
FIG. 18 is a view showing a remaining part of an example of a processing flow that is executed in the case in which the SU 20 is added to the computer system 1.

In the case in which an allocation completion notice of an IP address is obtained for all the internal apparatuses, a management authority of all the internal apparatuses is transferred from the rack manager 22 to the management server 10 as shown in FIG. 18. More specifically, the following processing is executed for instance:

(*) The rack manager 22 removes the VLAN1 and the VLAN2 from the management switch 25. By this configuration, a line that corresponds to the VLAN1 and the VLAN2 is deleted from the VLAN table 102.

(*) The rack manager 22 removes the I/F 1 and the I/F 2 from the NIC 44. The I/F 3 can also be removed as substitute for the I/F 2.

(*) The rack manager 22 couples the port P1 that has been coupled to the management server 10 to the VLAN3. By this configuration, "T" is set to a cell that corresponds to the port P1 and the VALN3 for the VLAN table 102.

By this configuration, all the internal apparatuses 21 to 25 are coupled to the management server 10 via the VLAN3, and the management server 10 can manage all the internal apparatuses 21 to 25 via the port P1 and the VLAN3. In other words, a management authority of the internal apparatuses 21, 23, 24, and 25 that have been managed by the rack manager 22 and a management authority of the rack manager 22 are transferred to the management server 10. After a management authority of the internal apparatuses 21 to 25 is transferred to the management server 10, the internal apparatus 22 can be operated not as the rack manager but as a communication apparatus of other type. In the present embodiment, a communication apparatus of other type is an SVP (Service Processor) that is a maintenance terminal of the storage 24. However, a communication apparatus of other type can also be a communication apparatus such as a server and a storage. By this configuration, a hardware resource of the internal apparatus 22 that is operated as the rack manager (that is, an internal management computer that is configured to manage the internal apparatuses 21, 23, 24, and 25) before a management authority is transferred can be utilized in an effective manner.

Some processing of a sequence of processing that is executed in the present embodiment will be described in detail in the following with reference to FIG. 19 and FIG. 20.

Figure 19:
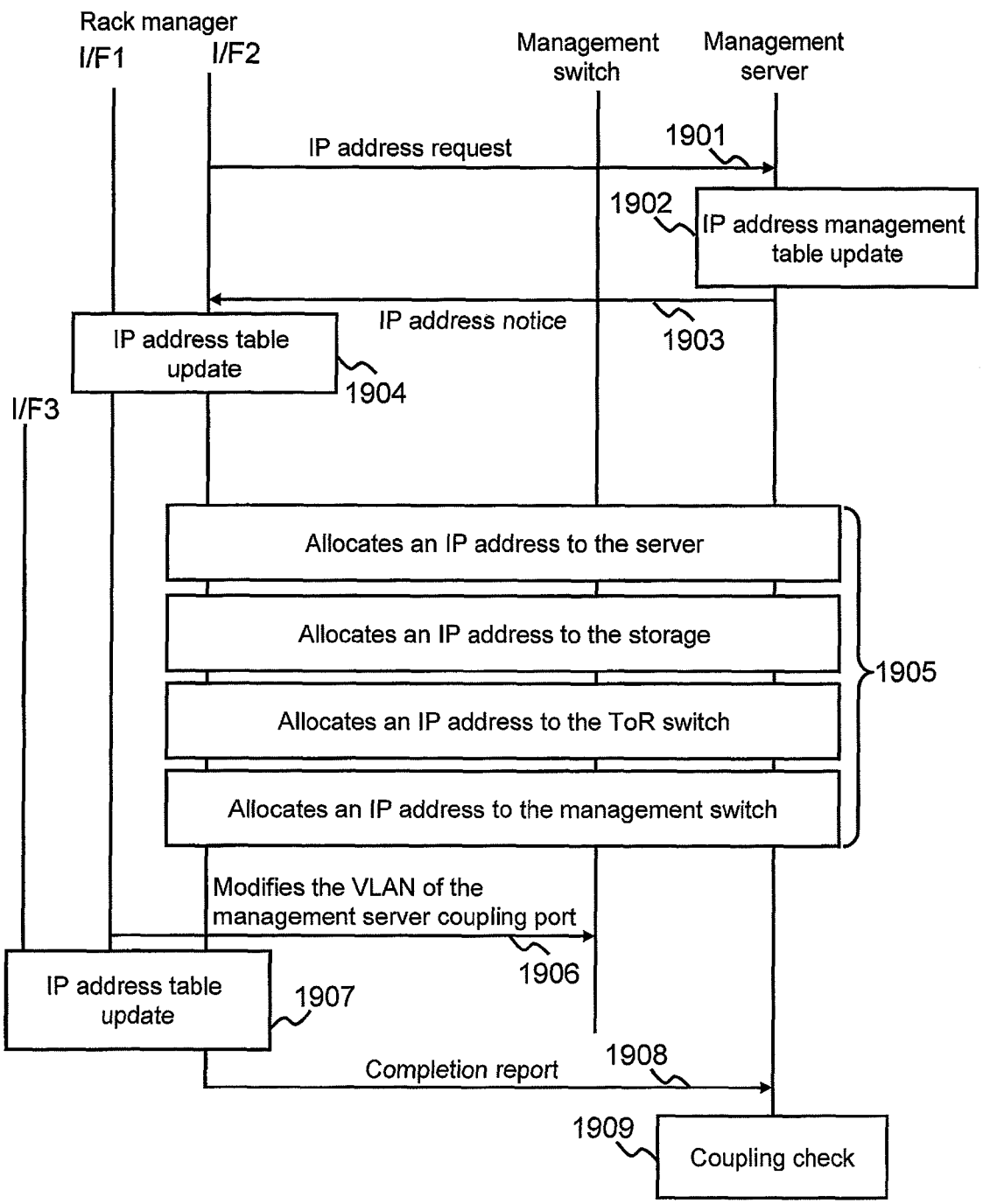
FIG. 19 is a sequence drawing showing a flow of an example of a processing that is executed in the case in which the SU 20 is added to the computer system 1.

FIG. 19 is a sequence drawing showing a flow of an example of a processing that is executed in the case in which the SU 20 is added to the computer system 1.

An IP address configuration program 81 in the rack manager 22 transmits an appropriate IP request from the I/F 2 to an IP address allocation program 71 in the management server 10 (step 1901). More specifically, the IP address configuration program 81 calculates the required number of appropriate IP addresses based on the total number of NICs that are included in a plurality of internal apparatuses in the added SU 20 for instance, and transmits an appropriate IP request that includes the information that indicates the number to the IP address allocation program 71 in the management server 10.

The IP address allocation program 71 receives the appropriate IP request and executes the following processing in response to the request (step 1902):

(*) identifies an unallocated IP address (appropriate IP address) of the number that is equivalent to the required number of appropriate IP addresses based on the IP address management table 73; and (*) modifies a state 114 of the identified IP address (see FIG. 11) from "unallocated" to "under allocation".

A plurality of appropriate IP addresses that are identified can be serial numbers.

The IP address allocation program 71 transmits the information that indicates the plurality of appropriate IP addresses that has been identified in the step 1902 to the IP address configuration program 81 (step 1903).

The IP address configuration program 81 receives the information that has been transmitted in the step 1903 and executes the following processing (step 1904):

(*) configures the I/F 3 to the NIC 44 and configures one appropriate IP addresses of the plurality of appropriate IP addresses that is indicated by the information that has been transmitted to the I/F 3; and (*) adds a line that corresponds to the I/F 3 to the IP address table 84, registers an ID of the I/F 3 to the line as an I/F ID 121, registers an ID of the NIC 44 to which the I/F 3 has been configured as a NIC ID 122, registers the information that indicates an appropriate IP address that has been configured to the I/F 3 as an IP address 123, and registers the information that indicates a tag that is added to a packet via the VLAN3 as a VLAN tag 124.

The IP address configuration program 81 executes the following processing (step 1905):

(*) configures the VLAN3 to the management switch 25 via the I/F 1;

(*) couples the ports P2 to P5 to the VLAN3 via the I/F 1; and (*) configures at least two appropriate IP addresses other than the appropriate IP address that has been configured to the I/F 3 among the plurality of appropriate IP addresses that are indicated by the received information to at least two internal apparatuses 21, 23, 24, and 25.

The IP address configuration program 81 sets the management switch 25 in such a manner that a port to which the management server is coupled among the ports of the management switch 25 belongs to the VLAN3 (step 1906).

The IP address configuration program 81 removes the I/F 1 and the I/F 2 from the NIC 44. By this configuration, a line that corresponds to the I/F 1 and the I/F 2 is deleted from the IP address table 84 (step 1907).

The IP address configuration program 81 transmits a completion report to the IP address allocation program 71 (step 1908). A completion report can also be executed via the I/F 3 and the VLAN3.

The IP address allocation program 71 receives the completion report, and checks whether or not a communication can be executed for the appropriate IP address that has been transmitted in the step 1903 (step 1909). The check can also be executed in accordance with a predetermined protocol (for instance, ICMP (Internet Control Message Protocol)).

Figure 20:
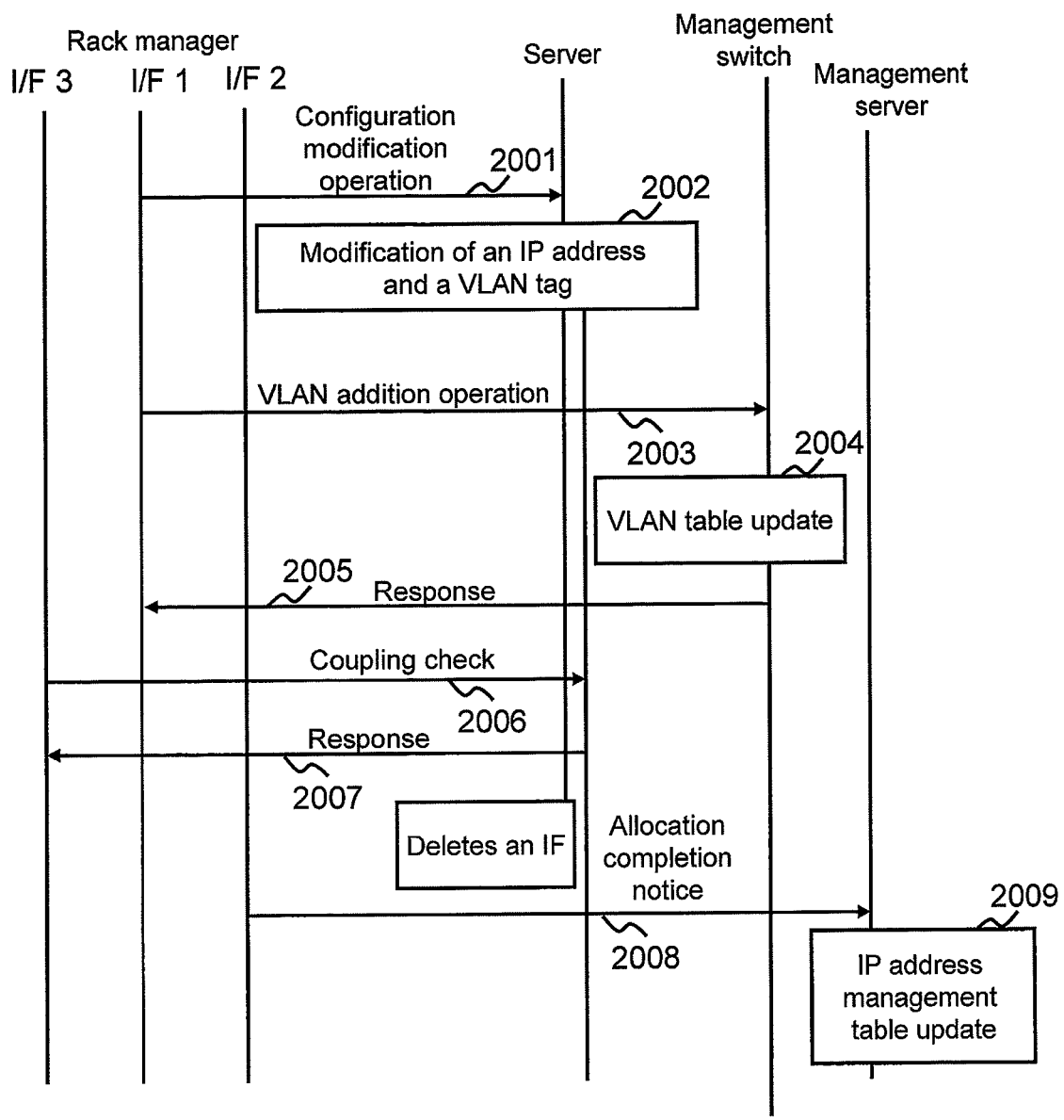
FIG. 20 is a sequence drawing showing an example of a flow of a part of a processing (a processing related to the server 23) of the step 1905 of FIG. 19.

FIG. 20 is a sequence drawing showing an example of a flow of a part of a processing (a processing related to the server 23) of the step 1905 of FIG. 19. While FIG. 20 is a drawing showing an example of the server 23 as an internal apparatus, it is possible that a configuration of the appropriate IP address to an internal apparatus of other type is completed by executing a processing similar to a processing shown in FIG. 20 for an internal apparatus of other type in the step 1905 of FIG. 19.

The IP address configuration program 81 establishes a session for executing a command operation by using a protocol such as Telnet (Telecommunication network) to the command reception program 91 in the server 23 via the I/F 1. The IP address configuration program 81 transmits the IP configuration command for adding an appropriate IP address (for instance, 10.1.2.3) in addition to an initial IP address for the NIC 54 of the server 23 to the command reception program 91 in the server 23 (step 2001). It is also possible that the above operation is executed by the method in which the IP address configuration program 81 directly rewrites the IP address table 93 in the server 23 and the NIC 54 of the server 23 recognizes again the IP address table 93 that has been rewritten.

The command reception program 91 in the server 23 executes the following processing in response to the above IP configuration command (step 2002):

(*) modifies an IP address of the I/F of the NIC 54 of the server 23 from an initial IP address to an appropriate IP address (for instance, 10.1.2.3); and (*) registers the information that indicates the appropriate IP address that has been configured to the IP address table 93 in the server 23 as an IP address of the I/F of the NIC 54, and registers "3" as a VLAN tag.

By this configuration, the rack manager 22 can communicate with the server 23 via the VLAN3.

The IP address configuration program 81 establishes a session for executing a command operation by using a protocol such as Telnet to the configuration program 103 in the management switch 25 via the I/F 1. The IP address configuration program 81 transmits the VLAN addition command for adding the VLAN3 in the case in which the VLAN3 is not configured to the management switch 25 and transmits the coupling modification command for coupling the port P4 to which the server 23 has been coupled to the VLAN3 to the configuration program 103 (step 2003).

The configuration program 103 updates the VLAN table 104 by executing a processing that conforms to the VLAN addition command and the coupling modification command (step 2004). Moreover, the configuration program 103 returns a response to the IP address configuration program 81 (step 2005).

The IP address configuration program 81 receives the response via the I/F 1, and transmits a packet for a coupling check to the command reception program 91 in the server 23 via the I/F 3 (step 2006). In the case in which the command reception program 91 receives a packet for a coupling check, the command reception program 91 transmits a response packet to the IP address configuration program 81 (step 2007). This operation can be executed in accordance with the predetermined protocol for instance. The predetermined protocol can be an ICMP for instance. A packet for a coupling check can be a ping for instance.

In the case in which the IP address configuration program 81 receives a response packet, the IP address configuration program 81 operates to delete the IP address that has been initially set to the NIC 54 of the server 23 by using a command or the like and transmits an allocation completion notice to the IP address allocation program 71 in the management server 10 via the I/F 2 (step 2008). The allocation completion notice can include an appropriate IP address that has been newly allocated to the I/F of the NIC 54 of the server 23 and a MAC address of the NIC 54. In the case in which the IP address allocation program 71 receives the allocation completion notice, the IP address allocation program 71 updates the IP address management table 73 (step 2009). More specifically, the IP address allocation program 71 registers a value of a MAC address that is included in the allocation completion notice as a MAC address 112, registers an ID of the added SU 20 that includes the server 23 as the SU ID 113, and registers "coupling" (the information that indicates that an allocation has been completed) as a state 114 to a line that includes an IP address that corresponds to an IP address that is included in the allocation completion notice (a line in the IP address management table 73).

The rack manager 22 also configures an appropriate IP address to the internal apparatuses of other types (such as the ToR switch 21, the storage 24, and the management switch 25) in a flow that is substantially equivalent to a flow of a processing shown in FIG. 20.

In accordance with the embodiment 1, in the case in which an SU 20 is newly added to the computer system 1, the initial IP address of each of the internal apparatuses in the SU 20 is modified to an appropriate IP address that has been supplied from the management server 10. Since the appropriate IP address that has been allocated to each of the internal apparatuses is a static IP address, the appropriate IP address is not modified after the restart. Moreover, a static IP address that can be allocated is managed by the management server 10, and a plurality of static IP addresses that are allocated to a plurality of internal apparatuses is automatically determined in response to the appropriate IP address. The plurality of static IP addresses is then automatically configured to the plurality of internal apparatuses in the flow described above. In the present the embodiment as described above, a static IP address is allocated to a communication apparatus in the SU 20 that has been added to the computer system 1 without the manual cumbersome and complicated steps.

Embodiment 2

The embodiment 2 in accordance with the present invention will be described in the following. In this case, a point that is different from the embodiment 1 will be described mainly, and the descriptions of a point in common with the embodiment 1 will be omitted or simplified (this is similar in the embodiment 3 and the embodiment 4 described later).

Figure 21:
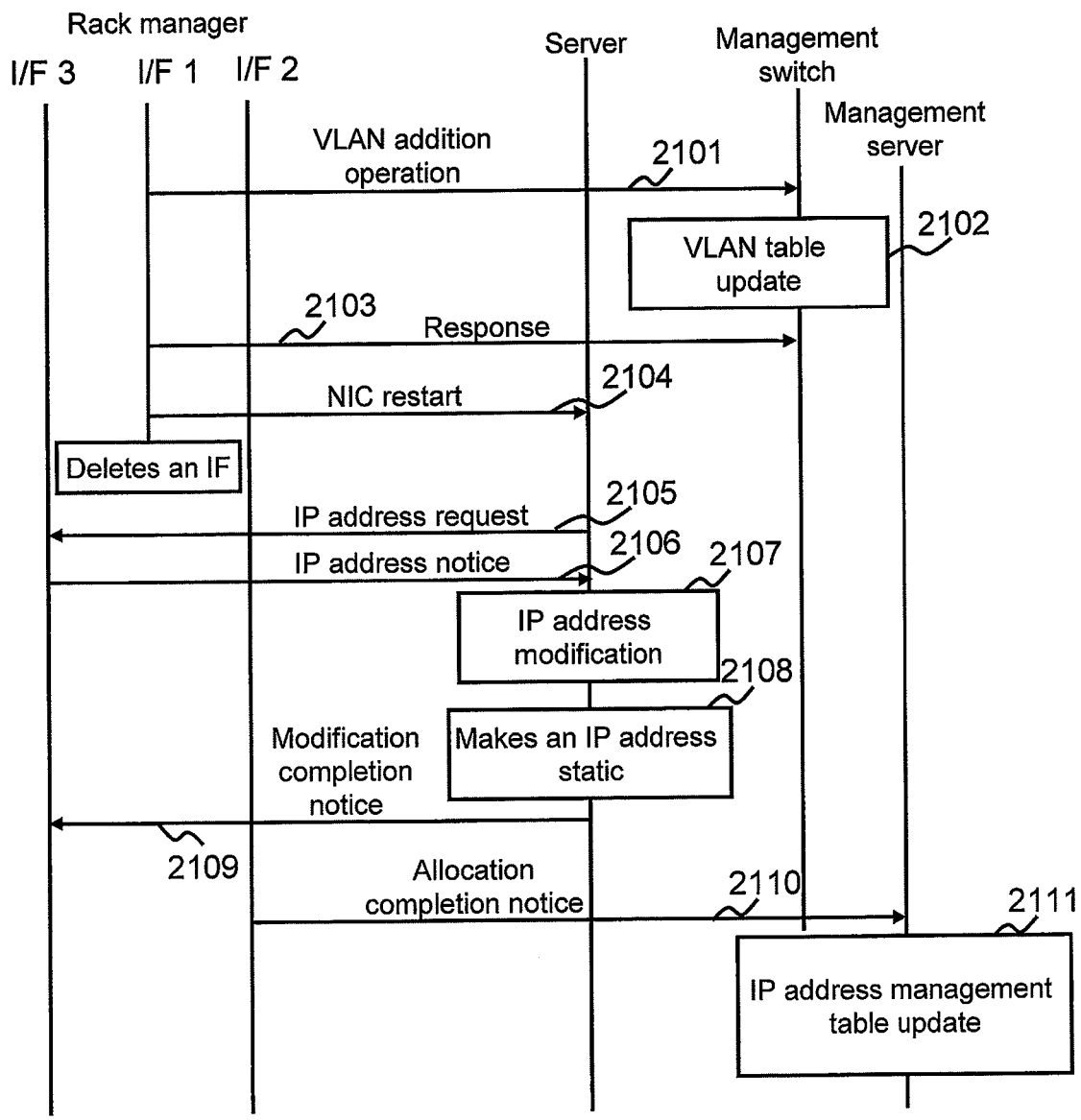
FIG. 21 is a sequence drawing showing an example of a flow of a part of a processing (a processing related to the server 23) of the step 1905 in accordance with an embodiment 2 of the present invention.

FIG. 21 is a sequence drawing showing an example of a flow of a part of a processing (a processing related to the server 23) of the step 1905 in accordance with the embodiment 2 of the present invention.

The IP address configuration program 81 establishes a session for executing a command operation by using a protocol such as Telnet to the configuration program 103 in the management switch 25 via the I/F 1. The IP address configuration program 81 transmits the VLAN addition command for adding the VLAN3 in the case in which the VLAN3 is not configured to the management switch 25 and transmits the coupling modification command for coupling the port P4 to which the server 23 has been coupled to the VLAN3 to the configuration program 103 (step 2101).

The configuration program 103 updates the VLAN table 104 by executing a processing that conforms to the VLAN addition command and the coupling modification command (step 2102). Moreover, the configuration program 103 returns a response to the IP address configuration program 81 (step 2103).

The IP address configuration program 81 receives the response by the I/F 1, and executes a power activation to the server 23 via the I/F 1 (step 2104). This process can be executed by using a technique such as Wake on LAN (WoL). After that, the IP address configuration program 81 deletes an interface to which an IF number "1" is added.

In the case in which a power activation is executed to the server 23, the DHCP client program 802 that is stored into the memory 1501 transmits an IP address allocation request to the DHCP server program 502 that is stored into the memory of the rack manager 205 (step 2105). The DHCP client program 92 in the server 24 transmits an IP address allocation request to the DHCP server program 82 in the rack manager 22 via the I/F 1 and the VLAN1 (step 2105). The DHCP server program 82 receives the IP address allocation request via the VLAN1 and the I/F 1, identifies an IP address that is to be allocated from a plurality of appropriate IP addresses that have been transmitted from the management server 10, and transmits the information that indicates the appropriate IP address that has been identified via the I/F 1 and the VLAN1 (step 2106).

The DHCP client program 92 receives an appropriate IP address from the DHCP server program 82, and modifies an IP address of the I/F of the NIC 54 from an initial IP address to the appropriate IP address (step 2107).

In the next place, the DHCP client program 92 manages the appropriate IP address that has been configured in accordance with the technique of the DHCP as a static IP address (step 2108). After that, the DHCP client program 92 transmits a modification completion notice to the rack manager 22 (step 2109). Since the modification completion notice is transmitted in a communication using the appropriate IP address that has been configured, the IP address configuration program 81 in the rack manager 22 receives the notice via the VLAN3 and the I/F 3.

The IP address configuration program 81 receives the notice, deletes the IP address that has been allocated to the server 23 from the DHCP client table, and transmits an allocation completion notice to the IP address allocation program 71 in the management server 10 via the I/F 2 and the VLAN2 (step 2110). The allocation completion notice includes an appropriate IP address that has been allocated to the I/F of the NIC 54 of the server 23 and a MAC address of the NIC 54. The IP address allocation program 71 executes a processing similar to a processing of the step 2009 of FIG. 20 (step 2111).

In accordance with the embodiment 2, an appropriate IP address can be configured to an internal apparatus without directly operating an internal apparatus using a command or the like by the rack manager 22.

In accordance with the embodiment 2, instead of operating the DHCP server program 82 in the rack manager 22, it is also possible that a DHCP forwarder (not shown) in the management switch 25 is made to be effective and the DHCP server program 72 in the management server 10 allocates an IP address to each of the internal apparatuses.

Embodiment 3

The embodiment 3 in accordance with the present invention will be described in the following.

Figure 22:
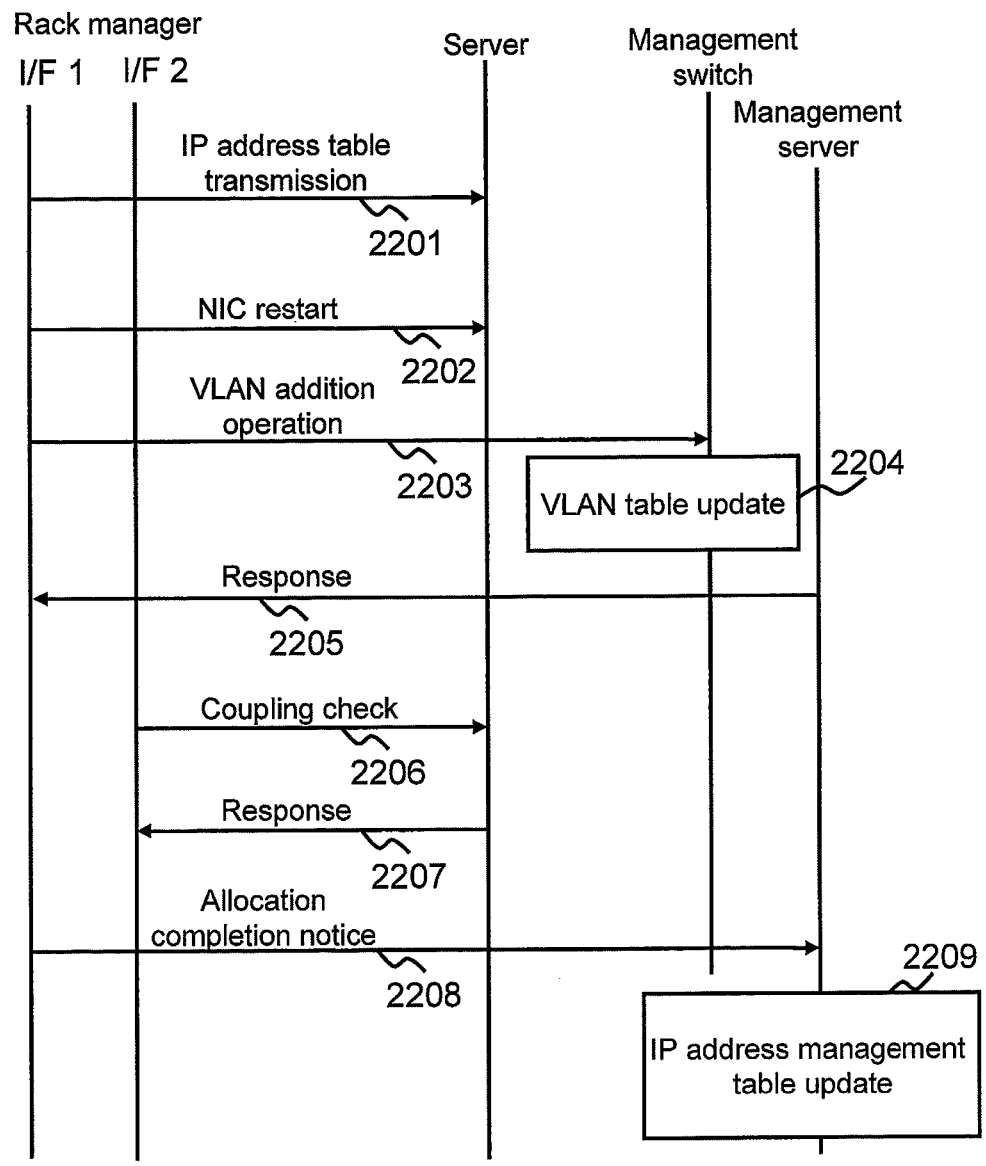
FIG. 22 is a sequence drawing showing an example of a flow of a part of a processing (a processing related to the server 23) of the step 1905 in accordance with an embodiment 3 of the present invention.

FIG. 22 is a sequence drawing showing an example of a flow of a part of a processing (a processing related to the server 23) of the step 1905 in accordance with the embodiment 3 of the present invention.

The IP address configuration program 81 transmits a part related to the server 23 for the information that is included in the IP address table 84 to the server 23 via the I/F 1 when the NIC 54 of the server 22 is started (step 2201). For instance, the information part that is included in the IP address table 84 is a file. The command reception program 91 in the server 23 functions as a server program of a file transfer protocol such as an FTP server and an HTTP server. Consequently, the IP address configuration program 81 can execute the step 2201 by functioning as a client program of a file transfer protocol such as an FTP client and an HTTP client.

After that, the IP address configuration program 81 restarts the NIC 54 of the server 22 (step 2202). The steps 2203 to 2209 that follows the step 2202 are equivalent to the steps 2003 to 2009 in the embodiment 1 (see FIG. 20).

In accordance with the embodiment 3, an appropriate IP address can be configured to an internal apparatus without directly operating an internal apparatus using a command or the like by the rack manager 22.

Since the IP addresses that have been added to the interfaces that are identified by the IF numbers "2" and "3" belong to the same subnet in the embodiment 1, it is necessary that the rack manager 205 specifies an interface that transmits a packet in a packet transmission. However, there is only interfaces to which the IF numbers "1" and "2" are added and these belong to separate subnets in the present embodiment, it is not necessary that the rack manager 205 specifies an interface in a packet transmission, whereby a processing can be simplified.

Embodiment 4

The embodiment 4 in accordance with the present invention will be described in the following.

Figure 23:
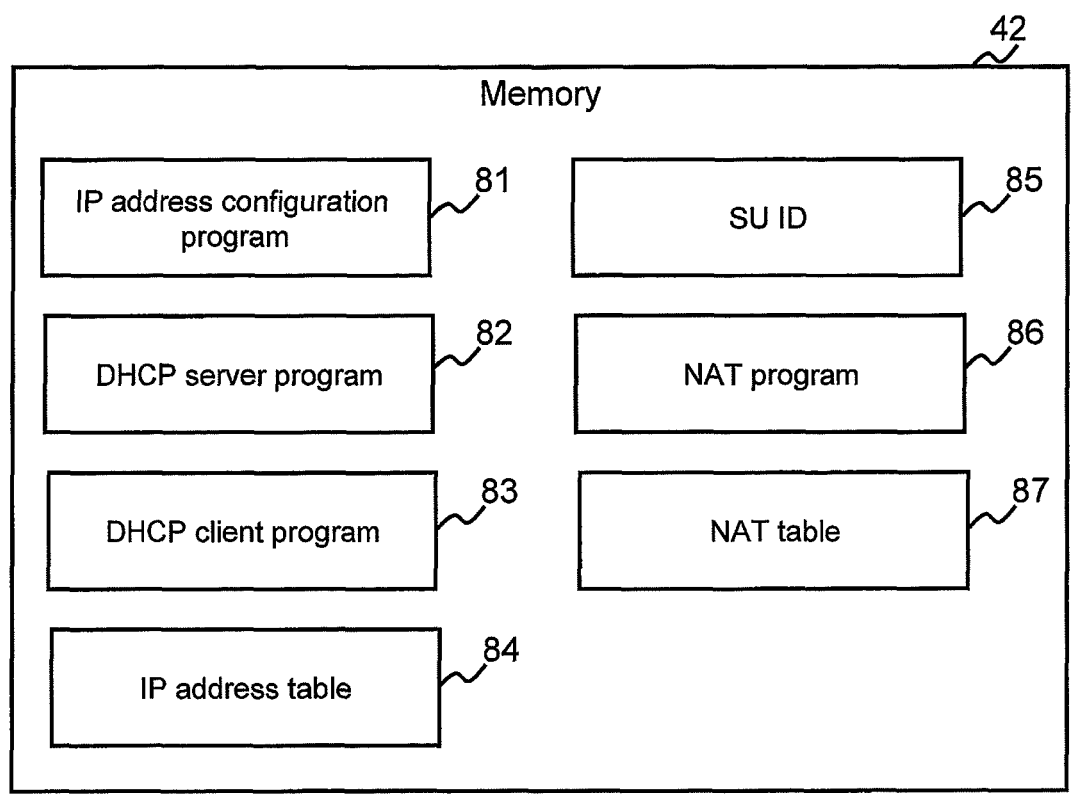
FIG. 23 is a view showing a configuration example of the memory 42 of the rack manager 22 in accordance with an embodiment 4 of the present invention.

FIG. 23 is a view showing a configuration example of the memory 42 of the rack manager 22 in accordance with the embodiment 4 of the present invention.

The memory 42 of the rack manager 22 in accordance with the embodiment 4 stores a NAT (Network Address Translation) program 86 and a NAT table 87.

The NAT program 86 is a program that is configured to implement a function for sharing an external IP address (a global IP address) by a plurality of communication apparatuses. The NAT program 86 transparently executes a mutual conversion of an internal IP address (an IP address that is effective only in the predetermined group (such as a corporate enterprise)) and an external IP address.

The NAT table 87 is provided with the information that indicates the correspondence relationship between a plurality of external IP addresses and a plurality of internal IP addresses. FIG. 13 is a view showing a configuration example of the NAT table 87. The external global IP address 131 is the information that indicates an external IP address, more specifically, the information that includes an address and a TCP port that are used by the rack manager 22 as a representative of an internal apparatus in the case in which the rack manager 22 relays a communication between an internal apparatus and an external apparatus (the management server 10). The internal local IP address 132 is the information that indicates an internal IP address, that is, the information that indicates an IP address that has been allocated to the internal apparatus as a practical matter.

Figure 24:
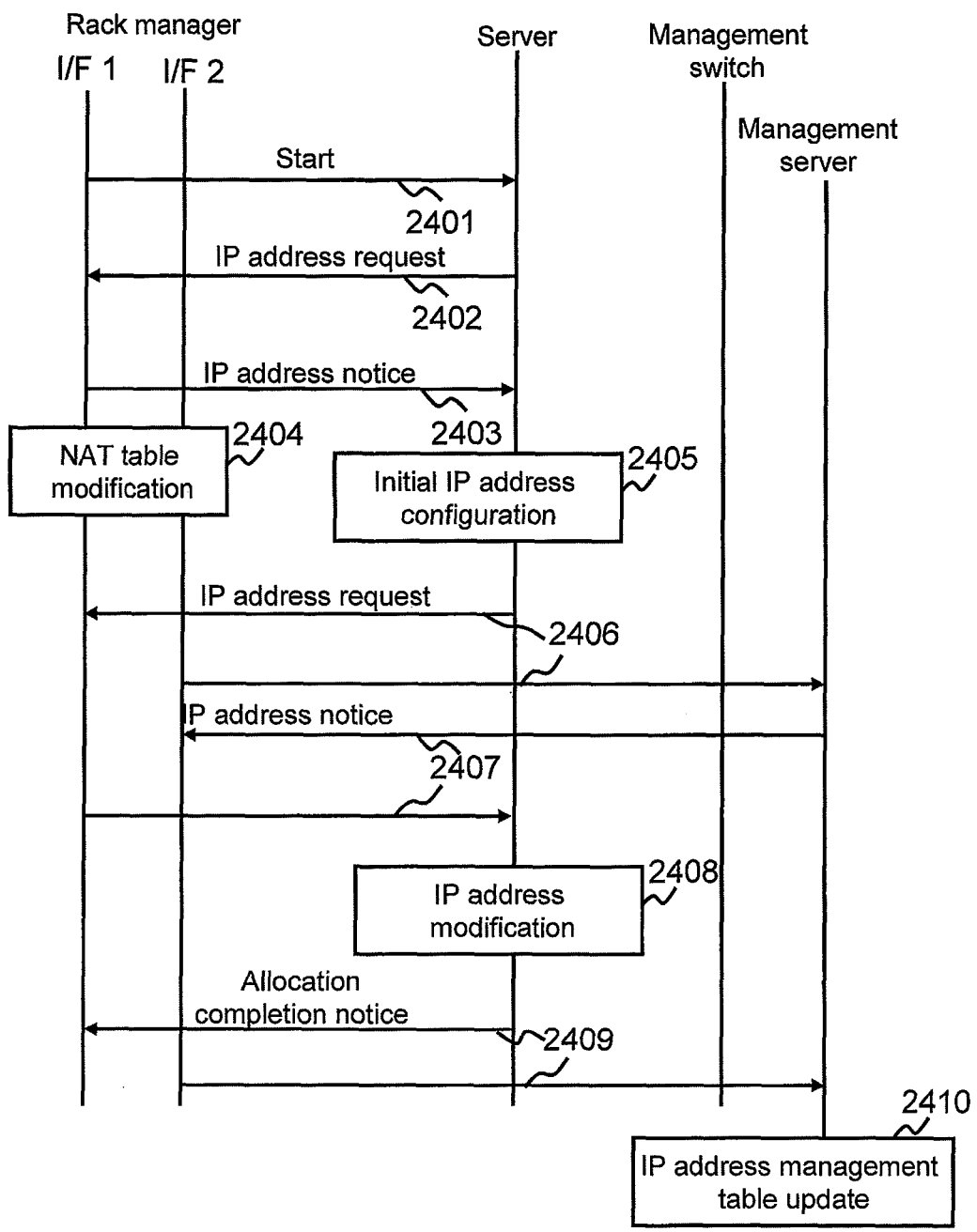
FIG. 24 is a sequence drawing showing an example of a flow of a part of a processing (a processing related to the server 23) of the step 1905 in accordance with an embodiment 4 of the present invention.

FIG. 24 is a sequence drawing showing an example of a flow of a part of a processing (a processing related to the server 23) of the step 1905 in accordance with the embodiment 4 of the present invention.

The rack manager 22 transmits a start command for starting the server 23 from the I/F 1 to the server 23 (step 2401).

The DHCP client program 92 in the server 23 transmits an IP address allocation request to the DHCP server program 82 in the rack manager 22 (step 2402).

The DHCP server program 82 receives the IP address allocation request via the VLAN1 and the I/F 1, identifies an IP address that is to be allocated from a plurality of appropriate IP addresses that have been transmitted from the management server 10, and transmits the information that indicates the appropriate IP address that has been identified via the I/F 1 and the VLAN1 (step 2403).

In the next place, the NAT program 86 adds an entry to the NAT table 87 (step 2404). In this step, an internal IP address "192.168.1.2" is allocated to the server 23, and an external IP address that corresponds the internal IP address is "10.1.2.1: 10002".

Subsequently, in the case in which the server 23 is a transmission source and the NAT program 86 receives a packet of which a destination is the management server 10 at the transmission source IP address of "192.168.1.2", the NAT program 86 rewrites the transmission source IP address to be "10.1.2.1", rewrites the transmission source TCP port number to be "10002", and transmits the packet to the management server 10.

Moreover, in the case in which the management server 10 is a transmission source and the NAT program 86 receives a packet of which a destination is the server 23 at a destination IP address of "10.1.2.1" and a destination TCP port of "10002", the NAT program 86 rewrites the destination IP address to be "192.168.1.2", and transmits the packet to the server 23.

By the above operation, the server 23 can execute a reception and a transmission of a packet with the management server 10 via a NAT function of the rack manager 22.

In the case in which the DHCP client program 92 in the server 23 receives an IP address from the rack manager 22, the DHCP client program 92 configures the IP address to the I/F of the NIC 54 (step 2405).

In the next place, the step 2406 is executed. That is, the DHCP client program 92 in the server 23 transmits an IP address request to the DHCP server program 82 in the rack manager 22. The IP address request is received via the I/F 1. The DHCP client program 83 in the rack manager 22 then transmits an IP address request to the DHCP server program 72 in the management server 10 via the I/F 2.

In the next place, the step 2407 is executed. That is, the DHCP server program 72 in the management server 10 receives the IP address request, and identifies an IP address in the state 114 of "unallocated" based on the IP address management table 73. The DHCP server program 72 modifies the state 114 that corresponds to the identified IP address from "unallocated" to "under allocation", and transmits the information that indicates the identified IP address to the DHCP client program 83 in the rack manager 22. The information is received via the I/F 2. The DHCP server program 82 in the rack manager 22 then transmits the information that has been received via the I/F 2 (the information that indicates the identified IP address) to the DHCP client program 92 in the server 23 via the I/F 1.

The DHCP client program 92 in the server 23 receives the information, and modifies an IP address of the I/F of the NIC 54 (54a or 54b) of the server 23 from an initial IP address to an IP address that is indicated by the received information (the identified IP address) (step 2408).

In the next place, the step 2409 is executed. That is, the DHCP client program 92 transmits an allocation completion notice to the DHCP server program 82 in the rack manager 22. The allocation completion notice is received via the I/F 1. The DHCP client program 83 in the rack manager 22 then transmits the allocation completion notice to the DHCP server program 72 in the management server 10 via the I/F 2.

After that, a processing similar to the step 2009 shown in FIG. 20 is executed (step 2410).

In accordance with the embodiment 4, regardless of the number of internal apparatuses in the SU 20, an IP address that is to be allocated can be a common external IP address. Consequently, it can be expected that a static IP address that is supplied to the SU 20 is prevented from being depleted.

While the preferred embodiments in accordance with the present invention have been described above, the present invention is not restricted to the embodiments.

For instance, it is also possible that the I/F that is formed in the NIC 44 of the rack manager 22 is not a virtual communication interface but a physical communication interface.

Moreover, it is also possible that the management switch 25 is not a management target of the rack manager 22 and the management server 10 for instance.

Moreover, it is also possible that the VLAN1 to the VLAN 3 are disposed in advance or dynamically generated or deleted on a timely basis in the case in which the SU 20 is added to the computer system 1.

Embodiment 5

The embodiment 5 in accordance with the present invention will be described in the following.

FIG. 25 is a view showing an example of a NAT table 507.

The NAT table 507 is provided with an internal local IP address 2501, an internal global IP address 2502, an external local IP address 2503, and an external global IP address 2504. The NAT program 86 is provided with a function for rewriting the transmission source IP address and the destination IP address of a packet based on the NAT table 87.

In the case in which there is an entry that corresponds to the transmission source IP address of a transmission packet for the internal local IP address 2501 in the NAT table 87, the NAT program 86 rewrites the transmission source IP address of the transmission packet to an internal global IP address 2502 that corresponds to the internal local IP address 2501.

In the case in which there is an entry that corresponds to the transmission source IP address of a reception packet for the internal global IP address 2502 in the NAT table 87, the NAT program 86 rewrites the transmission source IP address of the reception packet to an internal local IP address 2501 that corresponds to the internal global IP address 2502.

In the case in which there is an entry that corresponds to the destination IP address of a transmission packet for the external local IP address 2503 in the NAT table 87, the NAT program 86 rewrites the transmission source IP address of the transmission packet to an external global IP address 2504 that is corresponds to the external local IP address 2503.

In the case in which there is an entry that corresponds to the destination IP address of a reception packet for the external global IP address 2504 in the NAT table 87, the NAT program 86 rewrites the destination IP address of the reception packet to an external local IP address 2503 that corresponds to the external global IP address 2504.

Unlike the embodiment 1, an IP address "172.16.1.1" is allocated to an interface to which an IF number "2" is added in the present embodiment. Moreover, "172.16.1.2" is stored as the management server IP address 74.

An operation for setting the management server IP address 74 to the rack manager 22 in order to enable the rack manager 22 to communicate with the management server 10 is equivalent to an operation of the embodiment 1. More specifically, in the case in which the management server IP address 74 is set as "10.1.1.1" in the present embodiment, the IP address allocation program 71 adds an entry in which the internal local IP address 2501 is "172.16.1.1", the internal global IP address 2502 is "10.1.2.1", the external local IP address 2503 is "172.16.1.2", and the external global IP address 2504 is "10.1.1.1" to the NAT table 87 as substitute for an operation of storing the IP address as the management server IP address 74 similarly to the embodiment 1.

In the case in which the IP address configuration program 81 communicates with the management server 10, the communication is executed in the state in which the transmission source IP address is "172.16.1.1" and the destination IP address is "172.16.1.2". The above IP addresses are rewritten to "10.1.2.1" and "10.1.1.1" respectively by the NAT program 86 and are transmitted as a packet. By the above configuration, the rack manager 22 can communicate with the management server 10 in the state in which the destination IP address is "172.16.1.2".

An operation in which the IP address configuration program 81 that is stored into the rack manager 22 then communicates with the IP address allocation program 71 that is stored into the management server 10 and allocates an IP address to an apparatus in the SU 20 is similar to an operation of the embodiment 1.

It is necessary that the IP address configuration program 81 specifies an interface that is used for a transmission when the IP address configuration program 81 transmits a packet in order to add an IP address that belongs to the same subnet to an interface to which an IF number "2" is added and an interface to which an IF number "3" is added in the embodiment 1. In the present embodiment, it is not necessary that the IP address configuration program 81 specifies an interface that is used for a transmission when the IP address configuration program 81 transmits a packet.

REFERENCE SIGNS LIST

1: Computer system
10: Management server
20: SU (Scale Unit)
21: ToR (Top of Rack) switch
22: Rack manager
23: Server
24: Storage
25: Management switch

The invention claimed is:

1. A rack computer system comprising:
a computer subsystem that is newly coupled to a communication network; and
an external management apparatus that is disposed outside the computer subsystem and that is coupled to the communication network,
wherein the external management apparatus manages whether or not each of M static IP addresses can be allocated,
the computer subsystem includes a switch apparatus group that is at least one switch apparatus that is coupled to the communication network and N communication apparatuses (N is an integer number equal to or larger than 2 and is equal to or less than M),
the N communication apparatuses are an internal management apparatus that is coupled to the switch apparatus group and that is disposed in the computer subsystem and at least one communication apparatus that is coupled to the switch apparatus and that is a communication apparatus other than the internal management apparatus,
an IP address is allocated to each of the at least one communication apparatus in advance, and the internal management apparatus knows an initial IP address that is an IP address that has been allocated to each of the at least one communication apparatus in advance and can communicate with the at least one communication apparatus by using at least one initial IP address via the switch apparatus group,
the internal management apparatus can communicate with the external management apparatus via the switch apparatus group,
the internal management apparatus is provided with a first interface to a third interface that are coupled to the switch apparatus group,
the first interface is an interface that is used to communicate with the at least one communication apparatus,
the second interface is an interface that is used to communicate with the external management apparatus,
a network address of the initial IP address of the first interface and a network address of the at least one initial IP address of the at least one communication apparatus are equivalent to a first network address,
a network address of an IP address that has been allocated to the second interface and a network address of an IP address of the external management apparatus are equivalent to a second network address that is different from a first network address,
the internal management apparatus transmits from the second interface an IP address request that is a request of a plurality of IP addresses that are allocated to the N communication apparatuses to the external management apparatus,
the external management apparatus receives the IP address request, specifies a plurality of static IP addresses that can be allocated among the M static IP addresses, transmits IP address group information that indicates the plurality of specified static IP addresses to the internal management apparatus, and manages the plurality of specified static IP addresses as IP addresses that cannot be allocated, and
the internal management apparatus receives the IP address group information by the second interface, allocates the plurality of static IP addresses that are indicated by the IP address group information to the internal management apparatus and at least one communication apparatus, allocates one of the plurality of static IP addresses to the third interface, and allocates at least one static IP address of the plurality of static IP addresses to the at least one communication apparatus via the first interface.

2. A computer system according to claim 1, wherein:
the switch apparatus group is provided with a plurality of ports and a first VLAN to a third VLAN,
the plurality of ports includes a first port that is coupled to the external management apparatus, at least one second port to which the first interface to the third interface of the internal management apparatus are coupled, at least one third port to which the at least one communication apparatus is coupled,
the first port, the at least one second port, and the at least one third port belong to the first VLAN,
the first port and the at least one second port belong to the second VLAN,
the IP address request is transmitted to the external management apparatus via the second VLAN, and
the plurality of static IP addresses is allocated to the at least one communication apparatus via the first VLAN.

3. A computer system according to claim 2, wherein:
the internal management apparatus makes the first port, the at least one second port, and the at least one third port belong to the third VLAN after receiving the IP address group information and deletes the first VLAN and the second VLAN.

4. A computer system according to claim 3, wherein:
the third VLAN is a VLAN that is dynamically configured by the internal management apparatus after the computer subsystem is coupled to the communication network.

5. A computer system according to claim 4, wherein:
a network address of the plurality of static IP addresses that have been allocated to the third interface and to the at least one communication apparatus and a network address of an IP address of the external management apparatus are equivalent to the second network address,
the second VLAN and the third VLAN belong to the same subnet, the second VLAN is a VLAN without a tag, and
the third VLAN is a tag VLAN.

6. A computer system according to claim 5, wherein:
the external management apparatus preliminarily manages a plurality of existing apparatuses that are a plurality of communication apparatuses in at least one other computer subsystem that already exists before the computer subsystem is added, the first interface to the third interface are virtual communication interfaces that are configured in at least one physical communication interface apparatus that is included in the internal management apparatus, the internal management apparatus further deletes the first interface and the second interface, the internal management apparatus transmits a completion report from the third interface to the external management apparatus via the third VLAN, and after the external management apparatus receives the completion report, the external management apparatus manages the at least one communication apparatus by communicating with the at least one communication apparatus by using the at least one static IP address in addition to the plurality of existing apparatuses.

7. A computer system according to claim 3, wherein:

after receiving the IP address group information, the internal management apparatus checks whether or not the internal management apparatus can communicate with the at least one communication apparatus from the third interface based on the static IP address that has been allocated to the third interface and the at least one static IP address that has been allocated to the at least one communication apparatus, and makes the first port, the at least one second port, and the at least one third port belong to the third VLAN in the case in which the result of the check is positive.

8. A computer system according to claim 1, wherein:

a first IP address that is used to communicate with the external communication apparatus is dynamically allocated to the second interface, and an IP address of the external management apparatus is dynamically configured to the internal management apparatus.

9. A computer system according to claim 1, wherein:

the internal management apparatus restarts the physical communication interface apparatus of the target apparatus for a target apparatus that is at least one of the at least one communication apparatus, receives a request of an IP address from the target apparatus after that, and notifies the target apparatus of an IP address that can be allocated among the plurality of static IP addresses in response to the request, whereby the notified IP address is allocated to the physical communication interface apparatus of the target apparatus.

10. A computer system according to claim 1, wherein:

the internal management apparatus restarts the physical communication interface apparatus of the target apparatus for a target apparatus that is at least one of the at least one communication apparatus, and transmits a file that includes an IP address that can be allocated among the plurality of static IP addresses to the target apparatus by a file transfer protocol after that.

11. A computer system according to claim 1, wherein:

the internal management apparatus manages the correspondence relationship between at least one external IP address and a plurality of internal IP addresses, the external IP address is a static IP address that has been allocated from the external management apparatus, the internal IP address is an IP address that is unique to each of the communication apparatuses, and the internal management apparatus relays a communication between the external management apparatus and the communication apparatus by executing a conversion of the external IP address and the internal IP address.

12. A computer system according to claim 1, wherein:

the external management apparatus manages the at least one communication apparatus as substitute for the internal management apparatus by communicating with the at least one communication apparatus by using the at least one static IP address.

13. A method for newly adding a rack computer subsystem to a computer system wherein:

an external management apparatus that is coupled to a communication network manages whether or not each of M static IP addresses can be allocated, the computer subsystem that is added to the computer system that includes the external management apparatus includes a switch apparatus group that is at least one switch apparatus that is coupled to the communication network and N communication apparatuses (N is an integer number equal to or larger than 2 and is equal to or less than M), the N communication apparatuses are at least one communication apparatus that is coupled to an internal management apparatus that is coupled to the switch apparatus group and that is disposed in the computer subsystem and that is coupled to the switch apparatus and that is a communication apparatus other than the internal management apparatus, an IP address is allocated to each of the at least one communication apparatus in advance, and the internal management apparatus knows an initial IP address that is an IP address that has been allocated to each of the at least one communication apparatus in advance and can communicate with the at least one communication apparatus by using at least one initial IP address via the switch apparatus group, the internal management apparatus can communicate with the external management apparatus via the switch apparatus group, the internal management apparatus is provided with a first interface to a third interface that are coupled to the switch apparatus group, the first interface is an interface that is used to communicate with the at least one communication apparatus, the second interface is an interface that is used to communicate with the external management apparatus, a network address of the initial IP address of the first interface and a network address of the at least one initial IP address of the at least one communication apparatus are equivalent to a first network address, a network address of an IP address that has been allocated to the second interface and a network address of an IP address of the external management apparatus are equivalent to a second network address that is different from a first network address, the internal management apparatus transmits from the second interface an IP address request that is a request of a plurality of IP addresses that are allocated to the N communication apparatuses to the external management apparatus, the external management apparatus receives the IP address request, specifies a plurality of static IP addresses that can be allocated among the M static IP addresses, transmits IP address group information that indicates the plurality of specified static IP addresses to the internal management apparatus, and manages the plurality of specified static IP addresses as IP addresses that cannot be allocated, and the internal management apparatus receives the IP address group information by the second interface, allocates the plurality of static IP addresses that are indicated by the IP address group information to the internal management apparatus and at least one communication apparatus, allocates one of the plurality of static IP addresses to the third interface, and allocates at least one static IP address of the plurality of static IP addresses to the at least one communication apparatus via the first interface.

14. A rack computer subsystem comprising:

a switch apparatus group that is a switch apparatus that is coupled to a communication network; and N communication apparatuses (N is an integer number equal to or larger than 2), wherein the N communication apparatuses are at least one communication apparatus that is coupled to an internal management apparatus that is coupled to the switch apparatus group and that is disposed in the computer subsystem and that is coupled to the switch apparatus and that is a communication apparatus other than the internal management apparatus, an IP address is allocated to each of the at least one communication apparatus in advance, and the internal management apparatus knows an initial IP address that is an IP address that has been allocated to each of the at least one communication apparatus in advance and can communicate with the at least one communication apparatus by using at least one initial IP address via the switch apparatus group, the internal management apparatus can communicate with the external management apparatus via the switch apparatus group, the external management apparatus is coupled to the communication network, can manage a plurality of communication apparatuses in at least one other computer subsystem that is coupled to the communication network, and manages whether or not each of M static IP addresses can be allocated (M is an integer number equal to or larger than N), the internal management apparatus is provided with a first interface to a third interface that are coupled to the switch apparatus group, the first interface is an interface that is used to communicate with the at least one communication apparatus, the second interface is an interface that is used to communicate with the external management apparatus, a network address of the initial IP address of the first interface and a network address of the at least one initial IP address of the at least one communication apparatus are equivalent to a first network address, a network address of an IP address that has been allocated to the second interface and a network address of an IP address of the external management apparatus are equivalent to a second network address that is different from a first network address, the internal management apparatus transmits from the second interface an IP address request that is a request of a plurality of IP addresses that are allocated to the N communication apparatuses to the external management apparatus, and the internal management apparatus receives by the second interface IP address group information that indicates a plurality of static IP addresses that can be allocated among the M static IP addresses in response to the IP address request from the external management apparatus, allocates the plurality of static IP addresses that are indicated by the IP address group information to the internal management apparatus and at least one communication apparatus, allocates one of the plurality of static IP addresses to the third interface, and allocates at least one static IP address of the plurality of static IP addresses to the at least one communication apparatus via the first interface.

* * * * *